United States Patent
Nagano

(10) Patent No.: US 9,223,133 B2
(45) Date of Patent: Dec. 29, 2015

(54) IMAGE READING LENS, IMAGE READING DEVICE, AND IMAGE FORMING DEVICE

(71) Applicant: Takuya Nagano, Kanagawa (JP)

(72) Inventor: Takuya Nagano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/597,657

(22) Filed: Jan. 15, 2015

(65) Prior Publication Data

US 2015/0212319 A1 Jul. 30, 2015

(30) Foreign Application Priority Data

Jan. 28, 2014 (JP) ................................. 2014-013846

(51) Int. Cl.
| | |
|---|---|
| *H04N 1/04* | (2006.01) |
| *G02B 27/00* | (2006.01) |
| *H04N 1/028* | (2006.01) |
| *H04N 1/193* | (2006.01) |
| *G02B 9/34* | (2006.01) |
| *G02B 13/18* | (2006.01) |

(52) U.S. Cl.
CPC .............. *G02B 27/0031* (2013.01); *G02B 9/34* (2013.01); *G02B 13/18* (2013.01); *H04N 1/028* (2013.01); *H04N 1/1935* (2013.01); *H04N 2201/0081* (2013.01); *H04N 2201/0091* (2013.01); *H04N 2201/0093* (2013.01)

(58) Field of Classification Search
CPC . H04N 5/2251; H04N 9/045; H04N 5/23212; H04N 1/0402; H04N 1/0426; H04N 1/0455; H04N 1/12; H04N 2005/2255; G01J 3/502; A61B 1/00193; A61B 1/05; A61B 3/103; A61B 3/107; G01C 15/004
USPC ........... 348/335, 345, E9.01, E5.025, E5.028, 348/E5.035, E5.04, E9.052, 362, 45, 68; 358/474, 482, 48
See application file for complete search history.

(56) References Cited

U.S. PATENT DOCUMENTS

| | | | | |
|---|---|---|---|---|
| 5,047,847 | A * | 9/1991 | Toda et al. | 348/68 |
| 6,556,455 | B2 * | 4/2003 | Dibene et al. | 361/785 |
| 6,933,978 | B1 * | 8/2005 | Suda | 348/345 |
| 6,976,956 | B2 * | 12/2005 | Takahashi et al. | 600/166 |

(Continued)

FOREIGN PATENT DOCUMENTS

JP   2002-82282   3/2002

*Primary Examiner* — Negussie Worku
(74) *Attorney, Agent, or Firm* — Oblon, McClelland, Maier & Neustadt, L.L.P.

(57) ABSTRACT

An image reading lens includes a front lens group of five lenses including a positive lens and a negative lens, disposed on an object side and a rear lens group disposed on an image side, including a negative plastic lens. The image reading lens satisfies the following conditions:

$0 < \Sigma dn_N/dt(N) - \Sigma dn_P/dt(P) < 25$ $0.10 < fa/f \times d_{11}/D < 0.90$ $-1.5 < fb/f < -0.5$ $0.35 < d_{11}/D < 0.70$ where $\Sigma dn_N/dt(N)$ and $\Sigma dn_P/dt(P)$ are sums of $10^6$-fold temperature coefficients of refractive indexes of the negative and positive lenses of the front lens group along a He—Ne line at a temperature of 40 to 60° C., respectively, fa, fb, and f are focal lengths of the front lens group, rear lens group, and image reading lens, respectively, $d_{11}$ is an on-axis distance between the front and rear lens groups, and D is the total length of the image reading lens.

13 Claims, 17 Drawing Sheets

(56) References Cited

U.S. PATENT DOCUMENTS

| | | | |
|---|---|---|---|
| 7,057,659 B1* | 6/2006 | Mihara et al. | 348/345 |
| 8,427,569 B2* | 4/2013 | Sano | 348/335 |
| 2002/0101665 A1 | 8/2002 | Ohashi et al. | |
| 2002/0191302 A1* | 12/2002 | Tsutsumi | 359/675 |
| 2014/0253983 A1 | 9/2014 | Nagano | |
| 2014/0347710 A1* | 11/2014 | Nagano | 358/483 |

\* cited by examiner

IMAGE READING LENS, IMAGE READING DEVICE, AND IMAGE FORMING DEVICE

CROSS REFERENCE TO RELATED APPLICATION

The present application is based on and claims priority from Japanese Patent Application No. 2014-13846, filed on Jan. 28, 2014, the disclosure of which is hereby incorporated by reference in its entirety.

BACKGROUND OF THE INVENTION

1. Field of the Invention

The present invention relate to an image forming lens suitable for reading an image of a document in an image reading device such as an image scanner or an image forming device such as a facsimile machine or a digital copier as well as to an image reading device and an image forming device incorporating such an image forming lens.

2. Description of the Related Art

An image reading device is provided in an image scanner, a facsimile machine or a digital copier for reading an image of a document. In the device an image of the document is reduced in size with an image forming lens, a reduced optical image is captured on a solid image sensor such as CCD (charge coupled device), and image information is converted into electric image data. To read document information in color, a three-line CCD image sensor in which light receiving elements with red, green, and blue filters are arranged in three lines is used to form a reduced optical image on a light receiving surface and separate the color of the image into 3 primary colors. Thereby, color image information is converted into signals. Such an image reading lens is required to have high contrast in a high spatial frequency domain on an image plane and high aperture efficiency, as high as near 100% to an image periphery. Also, to read color documents properly, it is necessary to align imaging positions of the three primary colors along an optical axis on the light receiving surface and accurately correct respective color aberrations. A widely-used Gaussian image reading lens is a relatively large-aperture lens which can realize high resolution. However, for the purpose of achieving currently desired high performance, such a Gaussian lens structure has a problem that it requires a large number of lenses of 6 or more such as four groups of six lenses or five groups of eight lenses.

In view of this, Japanese Patent No. 3939908 discloses an image reading lens comprising three to five lenses less than lenses of a Gaussian lens and exerting similar or higher optical performance. This image reading lens can be comprised of 3 lenses minimally and a lens closest to an image and disposed adjacent to an image plane is of a negative power. Thereby, it can easily correct various kinds of aberrations and achieve high performance.

However, the above reference fails to address a problem that lens performance is deteriorated during a thermal increase inside an image reading device due to an increase in heat emission amount of an imaging unit as CCD or of a high-illuminance light source along with downsizing and high speed operation of the image reading device. A thermal increase inside the device causes a thermal expansion and a change in refractive index of materials of an image reading lens, resulting in varying the focal length of the image reading lens. Further, the heat emission of the imaging unit brings a thermal expansion of a holder for the imaging unit and the image reading lens, shifting a positional relation between a lens imaging position and the imaging plane and deteriorating lens performance. Further, the above reference discloses only a lens with angle of view of up to about 45 degrees and fails to fully consider downsizing the image reading device.

SUMMARY OF THE INVENTION

The present invention aims to provide a high-performance image reading lens with a well-designed configuration of a number of lenses as few as that of a Gaussian lens and a large angle of view of 56 degrees or more which can reduce a degradation of optical performance by a thermal change and properly correct various aberrations.

According to one embodiment, an image reading lens comprises a front lens group disposed on an object side, comprising first to fifth lenses including a positive lens and a negative lens; and a rear lens group disposed on an image side, comprising a negative plastic lens, wherein the image reading lens has angle of view of 56 degrees or more and is formed to satisfy the following four conditions:

$$0 < \Sigma dn_N/dt(N) - \Sigma dn_P/dt(P) < 25 \quad (1)$$

$$0.10 < fa/f \times d_{11}/D < 0.90 \quad (2)$$

$$-1.5 < fb/f < -0.5 \quad (3)$$

$$0.35 < d_{11}/D < 0.70 \quad (4)$$

where $\Sigma dn_N/dt(N)$ and $\Sigma dn_P/dt(P)$ are sums of $10^6$-fold temperature coefficients of refractive indexes of the negative and positive lenses of the front lens group along a He—Ne line at a temperature of 40 to 60 C., respectively, fa is a focal length of the front lens group, fb is a focal length of the rear lens group, f is a focal length of the entire image reading lens, $d_{11}$ is an on-axis distance between the front lens group and the rear lens group, and D is the total length of the image reading lens.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENT

Figure 1:
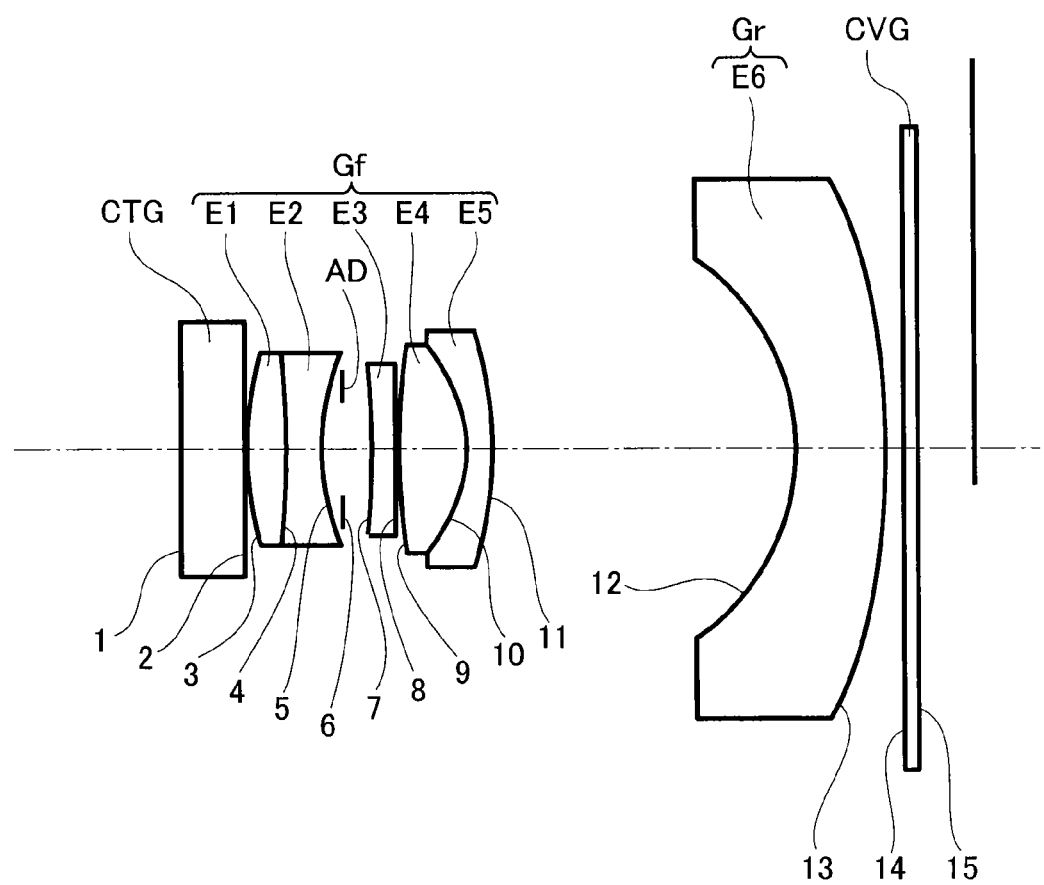
FIG. 1 is a cross section view of a first example of the structure of an image reading lens according to a first embodiment.

Hereinafter, embodiments of an image reading lens, an image reading device, and an image forming device will be described in detail with reference to the accompanying drawings.

An image reading lens according to a first embodiment is comprised of a front lens group on an object side and a rear lens group on an image side. The front lens group comprises five lenses including a positive lens and a negative lens. The rear lens group comprises a negative plastic lens.

According to one embodiment, the image reading lens at angle of view of 56 degrees or more is configured to satisfy the following four conditions:

$$0 < \Sigma dn_N/dt(N) - \Sigma dn_P/dt(P) < 25 \quad (1)$$

$$0.10 < fa/f \times d_{11}/D < 0.90 \quad (2)$$

$$-1.5 < fb/f < -0.5 \quad (3)$$

$$0.35 < d_{11}/D < 0.70 \quad (4)$$

where $\Sigma dn_N/dt(N)$ and $\Sigma dn_P/dt(P)$ are sums of $10^6$-fold temperature coefficients of refractive indexes of the negative and positive lenses of the front lens group along a He—Ne line at a temperature of 40° C. to 60° C., respectively, fa is a focal length of the front lens group, fb is a focal length of the rear lens group, f is a focal length of the entire image reading lens, $d_{11}$ is an on-axis distance between the front lens group and the rear lens group, and D is the total length of the image reading lens.

The conditions (1) and (2) define the temperature dependency of an imaging position of the image reading lens. With an upper limit value of the condition (1) exceeded, it becomes difficult for the six lenses including the plastic lens of the rear lens group to exert good imaging performance. Meanwhile, with a lower limit value of the condition (1) not reached, the front lens group cannot handle a decrease in the focal length caused by a decrease in the refractive index of the negative plastic lens of the rear lens group during a thermal increase. Therefore, the image reading lens cannot extend focal length during a thermal increase. The condition (2) is set for optimizing the imaging position in accordance with a temperature change by setting the rear lens group to follow the change of the imaging position properly and adjusting the interval between the front and rear lens groups. With an upper limit value of the condition (2) exceeded, the focal length of the image reading lens becomes too long during a thermal increase while with a lower limit value of the condition (2) not reached, the focal length is too short. Accordingly, with the range of the condition (2) exceeded, while an element to support the image reading lens and line CCD or CMOS is extended during an inner thermal increase of the device, an imaging position along the optical axis is largely offset. This makes it difficult for the image reading lens to achieve high image quality depending on a use environment.

That is, by disposing the plastic lens in the rear lens group and satisfying the conditions (1) and (2), it is possible to change the distance to the imaging position of the image reading lens following the extension of the lens holder and achieve high image quality in different thermal environment. Also, the condition (2) holds true when a lens barrel and an element between the front and rear lens groups are made from general metal with a linear coefficient of $1 \times 10^{-5}$ to $3 \times 10^{-5}$. Further, if the temperature coefficient of the refractive index of the plastic lens is $-1.01 \times 10^{-4}$/° C. and the influence from the element is cancelled to take a change in the distance to the image into account in detail, it is preferable to satisfy the following condition (2A):

$$0.05 \le (fa/f \times d_{11}/D)/\alpha \le 0.50$$

where $\alpha$ is a $10^5$-fold linear expansion coefficient of the element between the first and rear lens groups.

The condition (3) defines the ratio of the focal lengths of the entire image reading lens and the rear lens group. With an upper limit value of the condition (3) exceeded, the power of the negative lens of the rear lens group is too large so that it is difficult to properly correct aberration of the lens with a wide angle of view of 56 degrees or more. Meanwhile, with a lower limit value of the condition (3) not reached, the power of the negative lens is unsufficient relative to the entire lens system and the front lens group alone needs to correct aberration. Further, the condition (4) defines a magnitude of the on-axis distance between the front and rear lens groups relative to the total length of the image reading lens. With an upper limit value of the condition (4) exceeded, the total length of the image reading lens is increased and grown in size. With a lower limit value not reached, the diameter of the front lens group is enlarged, increasing the size and cost of the image reading lens.

Moreover, the image reading lens can correct color aberration properly by satisfying the following condition (5):

$$5 < v_P - v_N < 30$$

where $v_P$ is a mean value of abbe numbers of the positive lens relative to an e-line and $v_N$ is a mean value of abbe numbers of the negative lens relative to the e-line. The condition (5) defines the abbe number of dispersion of the image reading lens. Within the range of the condition (5), the image reading lens can correct chromatic aberration of magnification arising from a g-line and a C-line appropriately.

The image reading lens can correct off-axial aberration properly by satisfying the following condition (6):

$$-1.2 < R_3/R_{11} < -0.4$$

where $R_3$ is a curvature radius of an object-side surface of the first lens of the front lens group and $R_{11}$ is a curvature radius of an image-side surface of the fifth lens of the front lens group.

The condition (6) defines a ratio of the curvature radiuses of an object-side surface of the first lens and an image-side surface of the fifth lens of the front lens group. With the range of the condition (6) exceeded, the front lens group cannot sufficiently correct off-axial aberration and it is difficult for the single lens of the rear lens group alone to properly correct off-axial aberration. Within the range of the condition (6), the single lens of the rear lens group can correct aberration.

Further, the image reading lens can be further downsized by satisfying the following condition (7):

$$0.25 < (\phi b - \phi a)/d_{11} < 0.65$$

where $\phi a$ is an effective diameter of an image-side surface of the fifth lens of the front lens group, $\phi b$ is an effective diameter of an object-side surface of the negative lens of the rear lens group, and $d_{11}$ is an on-axis distance between the front lens group and the rear lens group.

The condition (7) defines a rate of a difference in the effective diameters of the image-side surface of the fifth lens of the front lens group and the object-side surface of the negative lens of the rear lens group relative to the on-axis distance between the front lens group and the rear lens group. With the range of the condition (7) exceeded, an off-axial light beam is sharply curved on both surfaces of the negative lens of the rear lens group so that aberration cannot be properly corrected.

Moreover, at least one surface of the rear lens group is preferably aspheric. Thereby, it is made possible to appropriately correct a distortion. More preferably, both surfaces of the rear lens group are aspheric to be able to properly correct aberration. Also, it is preferable that the image reading lens is configured of a biconvex lens, a biconcave lens, a negative meniscus lens, a biconvex lens, and a negative meniscus lens arranged in order from the object side. Thereby, the image reading lens of a compact size can correct aberration sufficiently at angle of view of 56 degrees or more.

Further, preferably, the first and second lenses of the front lens group and the fourth and fifth lenses are both cemented lenses. Thereby, the image reading lens of a compact size can correct aberration sufficiently at angle of view of 56 degrees or more. At least one surface of the front lens group is preferably aspheric to be able to correct aberration appropriately. Moreover, the outer shape of the negative lens of the rear lens group does not need to be rotationally symmetric relative to the optical axis since a light receiving element array is provided on the imaging plane. Also, the outer shape can be a short strip long in a main scanning direction. To achieve high image quality, it is necessary to enlarge the diameter of the negative lens of the rear lens group. However, with use of the light receiving element array, only a breadth through which a light beam travels has to be secured in the main scanning direction alone in which the light receiving elements are arranged. Because of this, not the diameter but the height of the image reading lens in a vertical direction to the arrangement of the light receiving elements can be reduced, resulting in downsizing.

Needless to say that the outer shape of the negative lens can be formed to be rotationally symmetric. In this case the entire image can be read at the same time by use of an area sensor. Thus, by use of the image reading lens, it is possible to realize a compact image reading device and a compact image forming device which can prevent a decrease in image reading accuracy due to a thermal change.

First Embodiment

Figure 2:
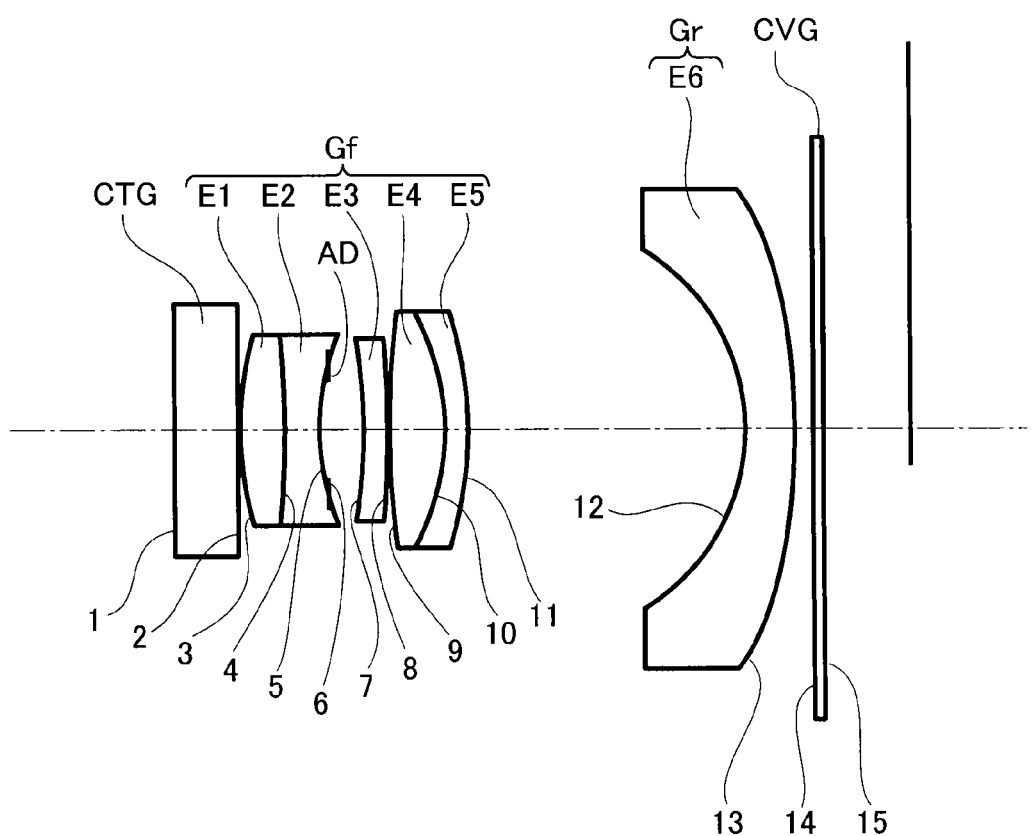
FIG. 2 is a cross section view of a second example of the structure of the image reading lens according to the first embodiment.
Figure 3:
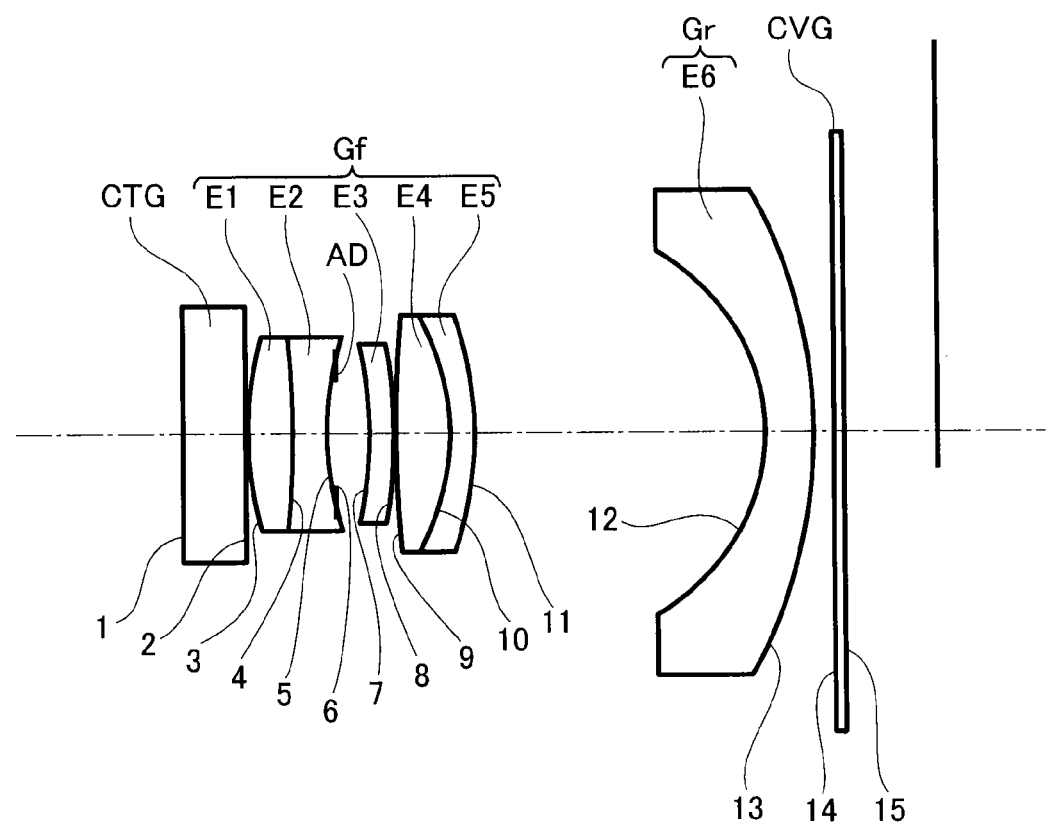
FIG. 3 is a cross section view of a third example of the structure of the image reading lens according to the first embodiment.
Figure 4:
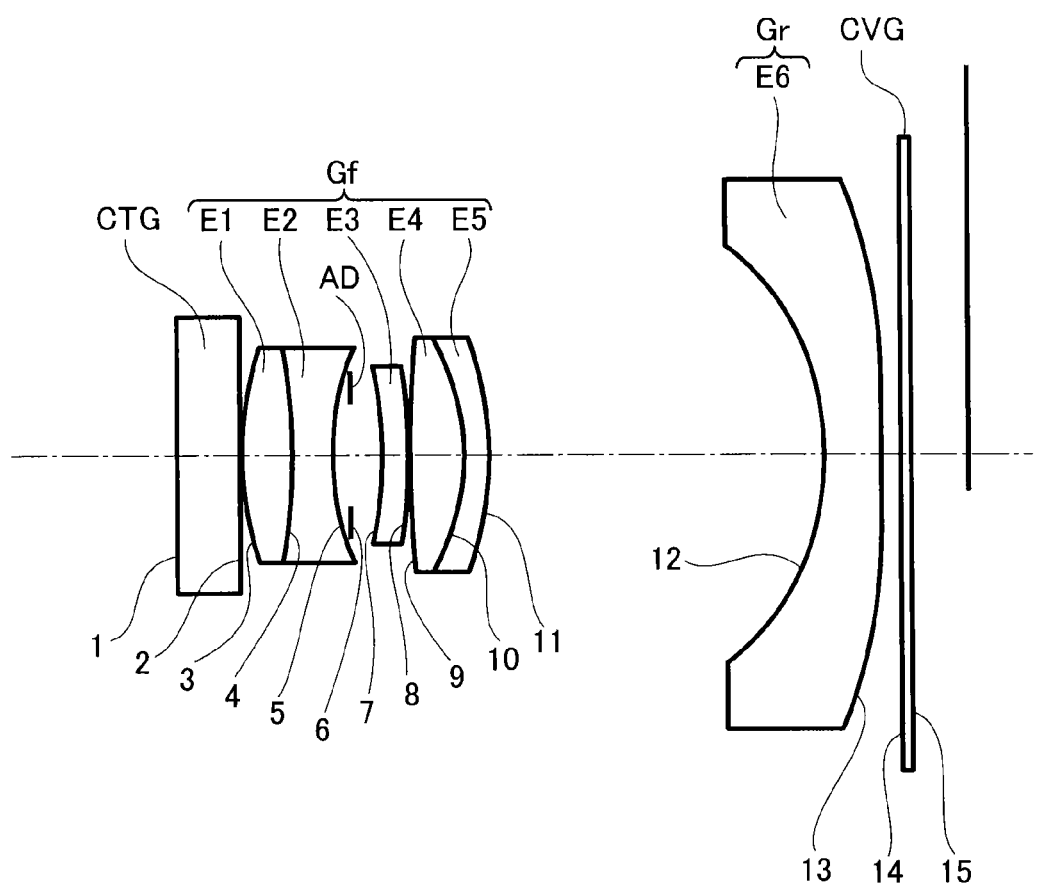
FIG. 4 is a cross section view of a fourth example of the structure of the image reading lens according to the first embodiment.
Figure 5:
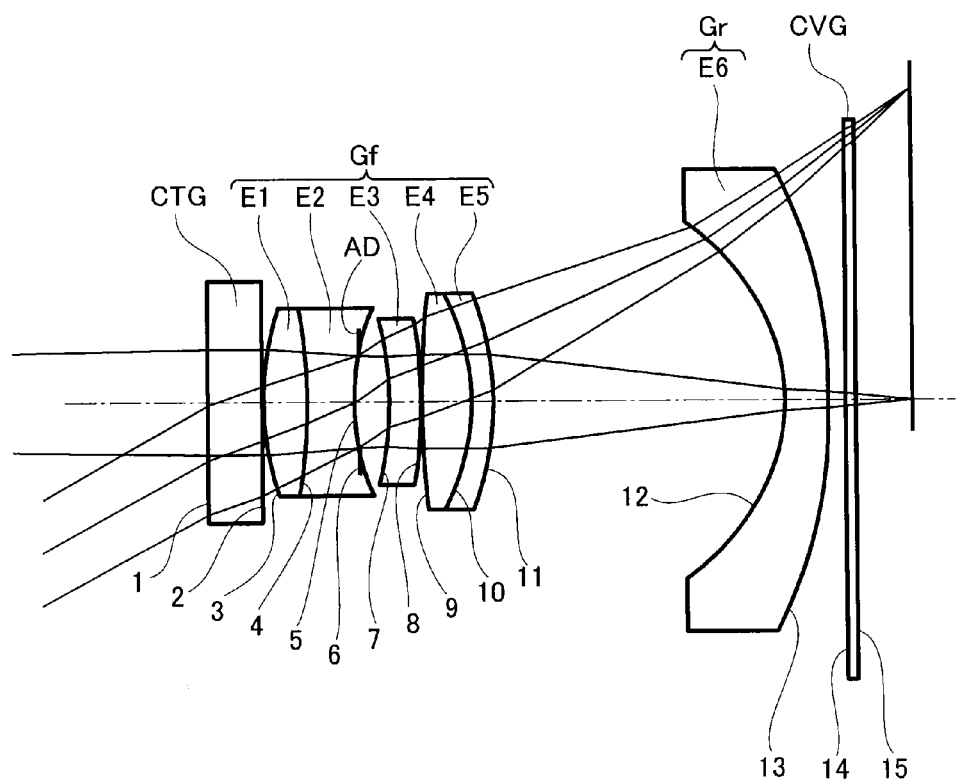
FIG. 5 is a cross section view of a fifth example of the structure of the image reading lens according to the first embodiment.
Figure 6:
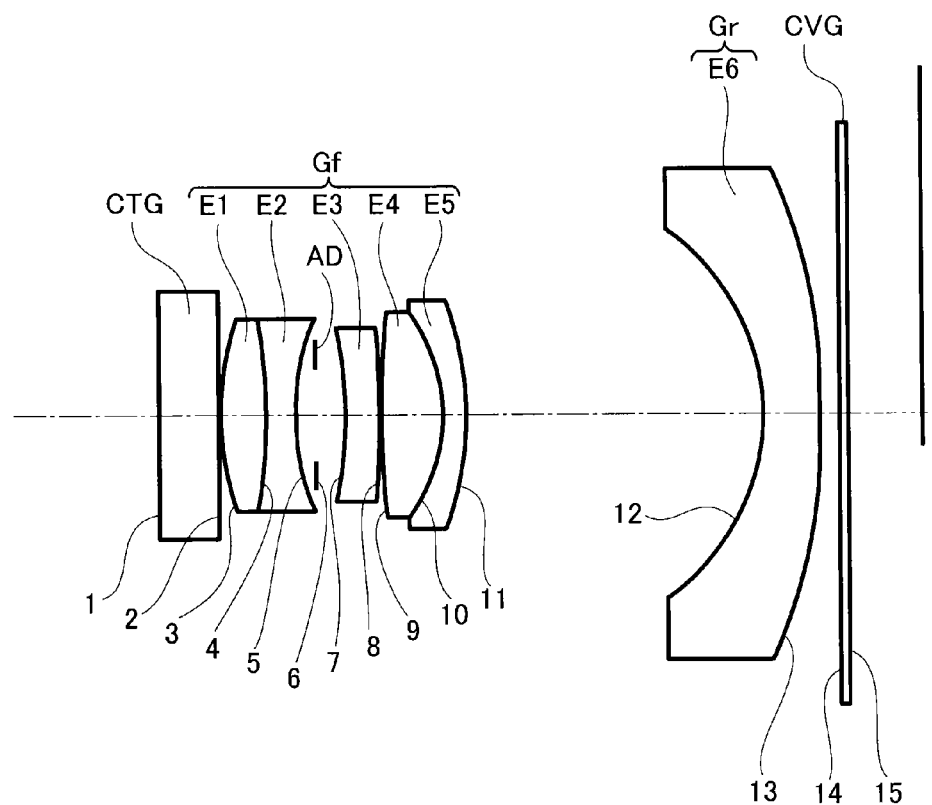
FIG. 6 is a cross section view of a sixth example of the structure of the image reading lens according to the first embodiment.
Figure 7:
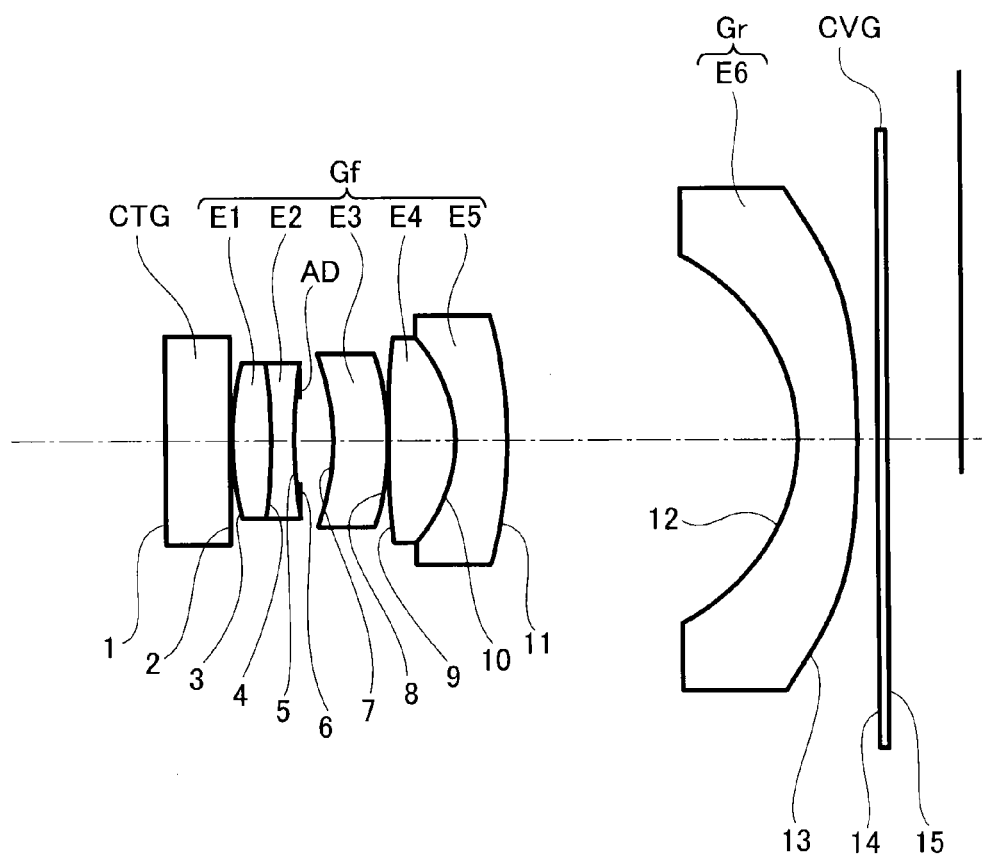
FIG. 7 is a cross section view of a seventh example of the structure of the image reading lens according to the first embodiment.
Figure 8:
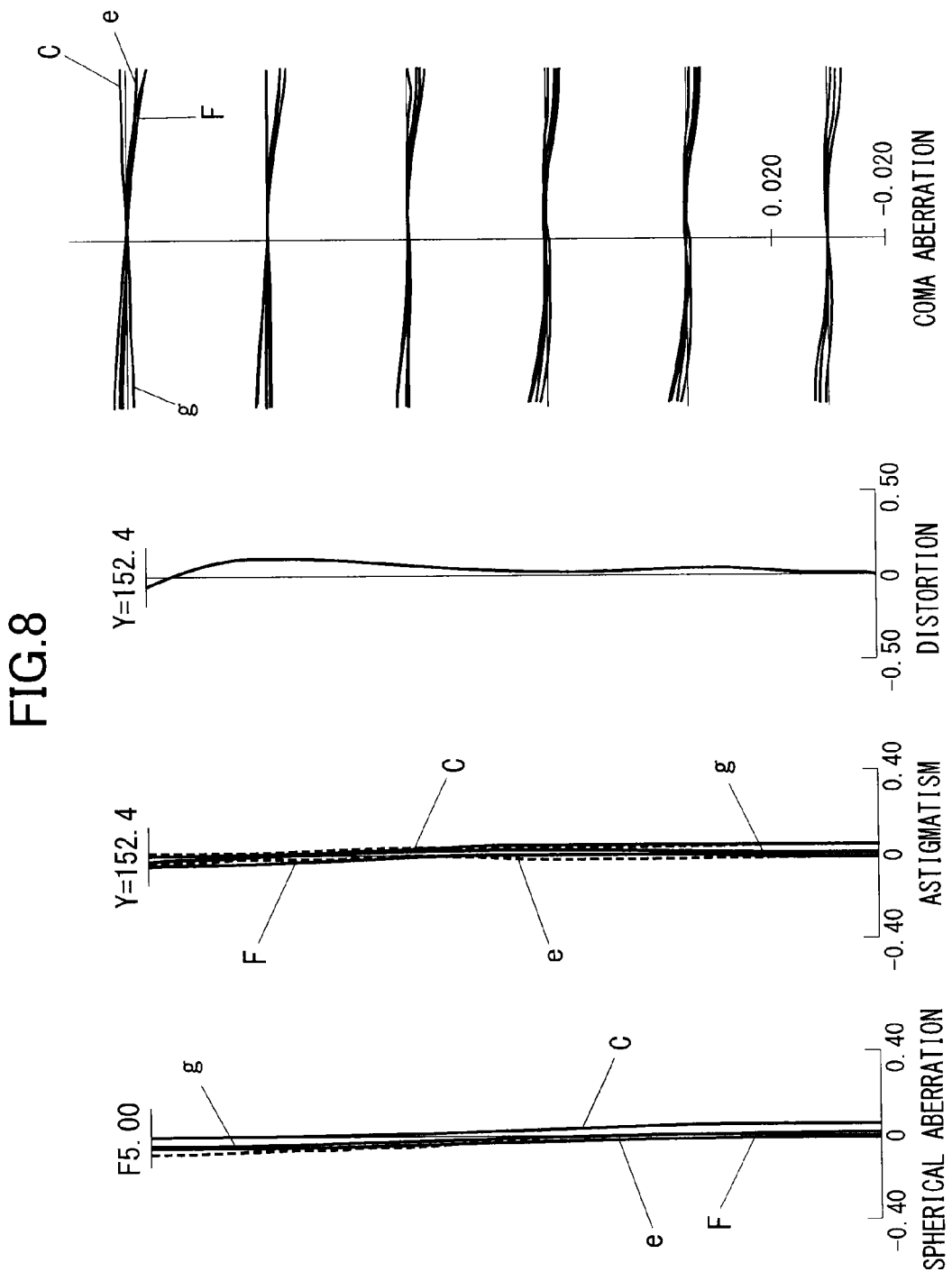
FIG. 8 shows aberrations of the first example of the image reading lens in FIG. 1.
Figure 9:
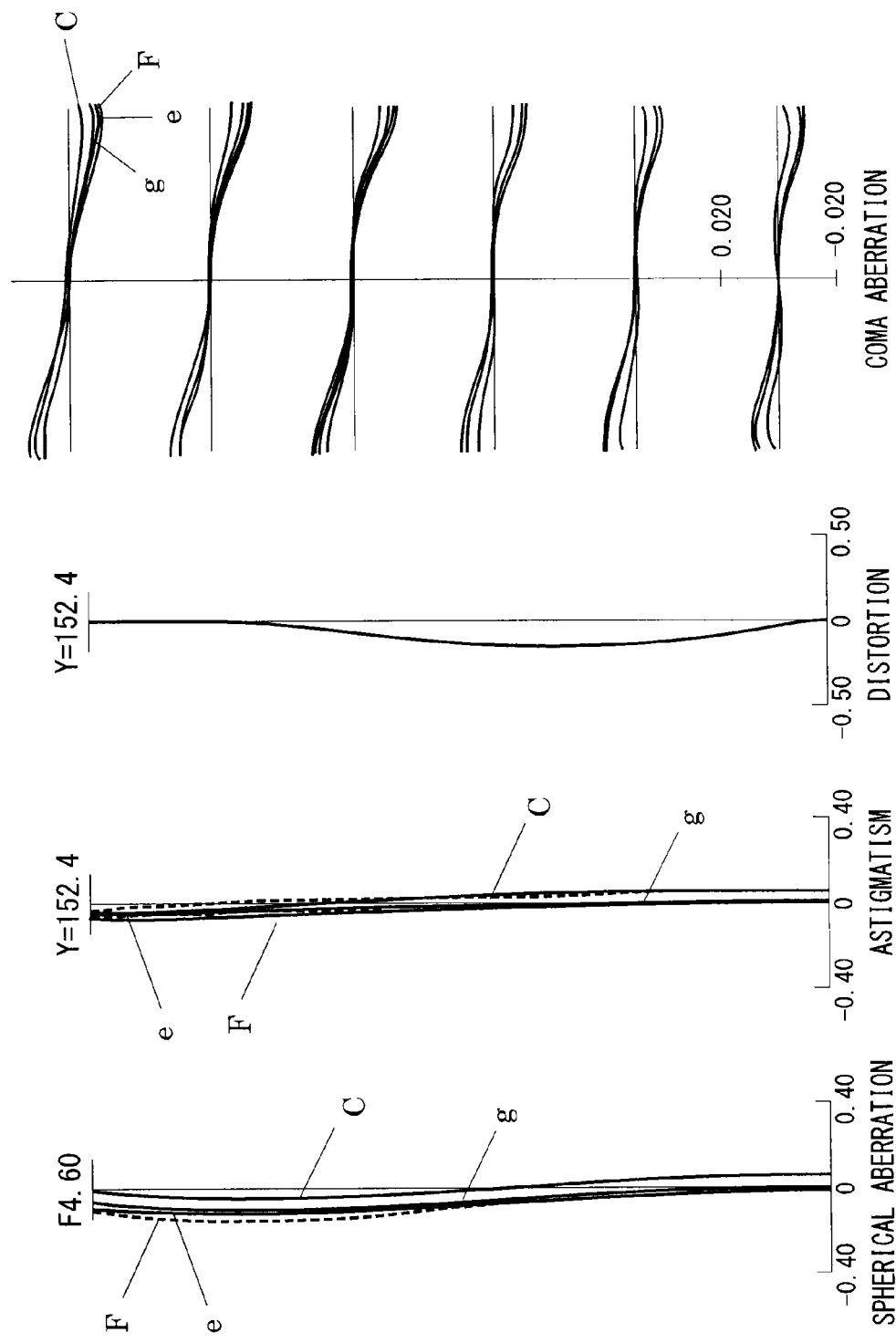
FIG. 9 shows aberrations of the second example of the image reading lens in FIG. 2.
Figure 10:
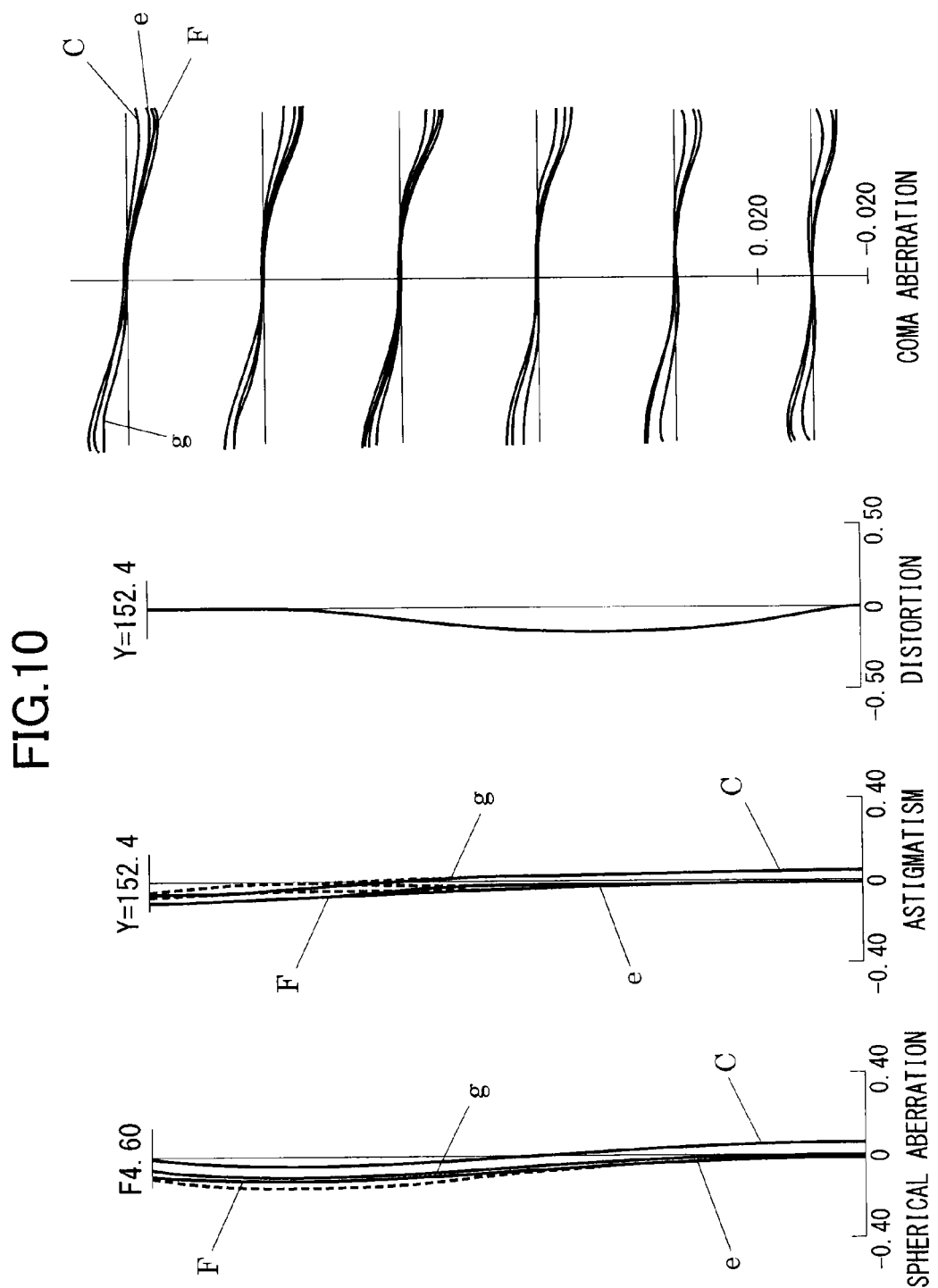
FIG. 10 shows aberrations of the third example of the image reading lens in FIG. 3.
Figure 11:
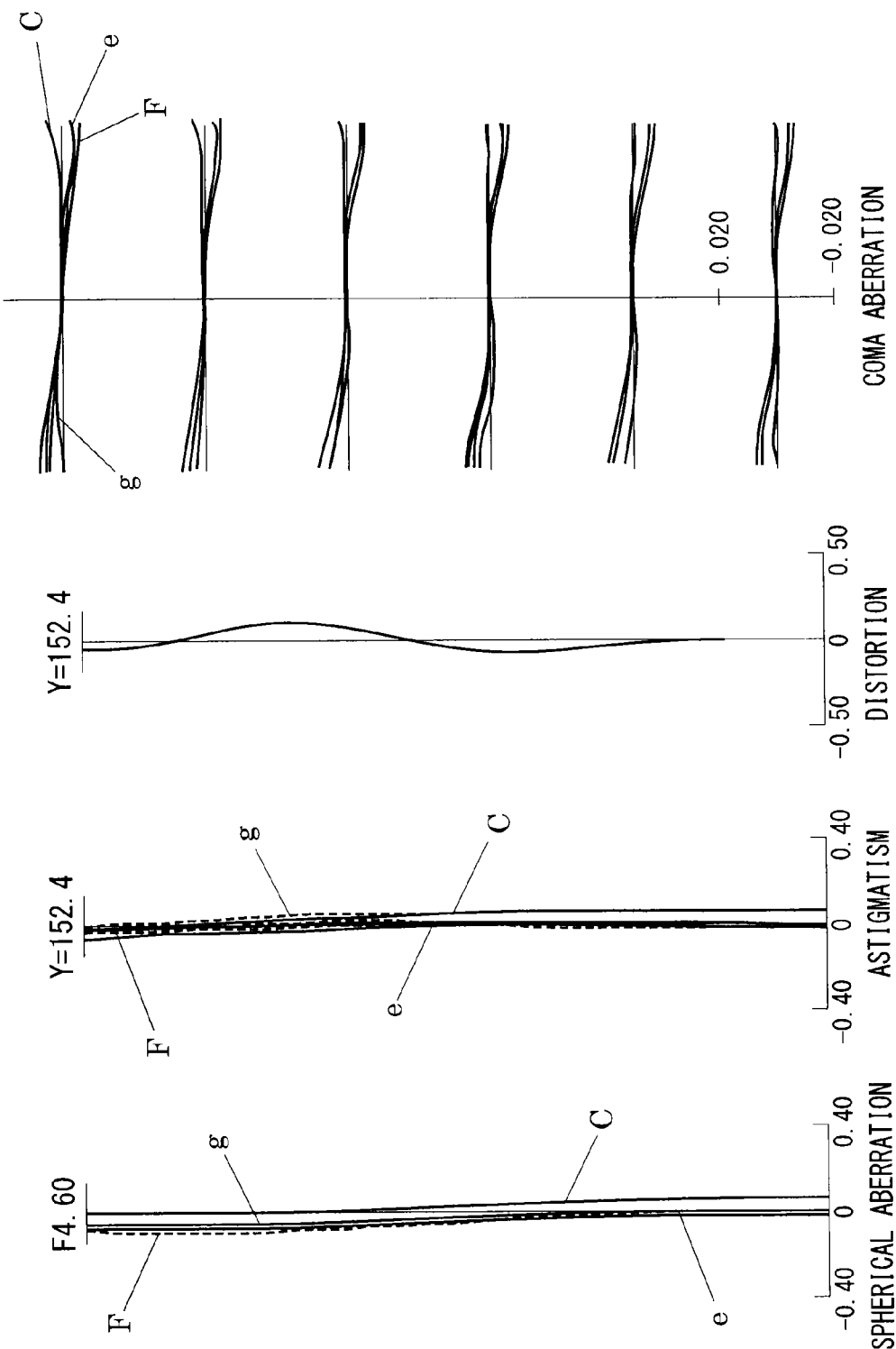
FIG. 11 shows aberrations of the fourth example of the image reading lens in FIG. 4.
Figure 12:
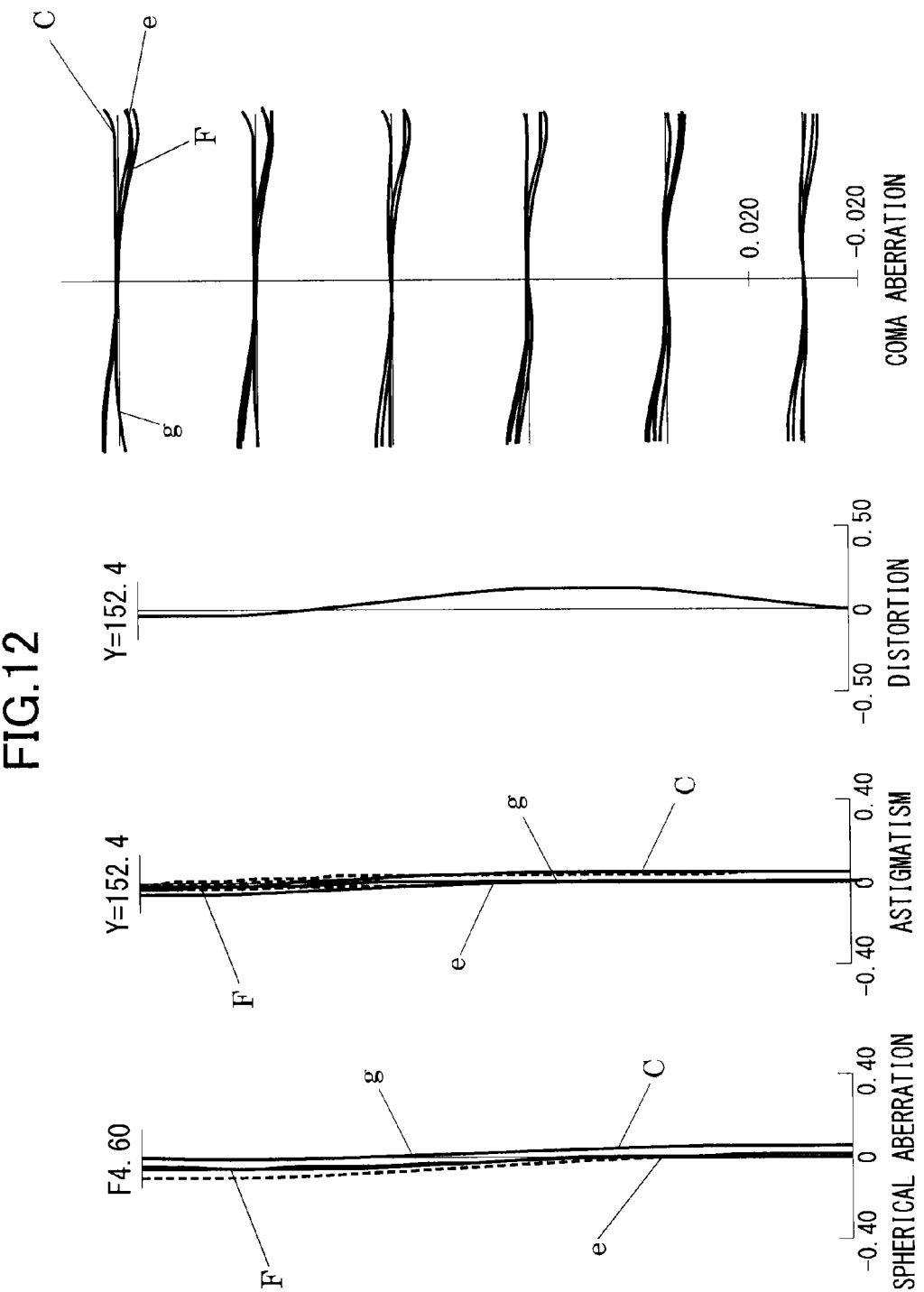
FIG. 12 shows aberrations of the fifth example of the image reading lens in FIG. 5.
Figure 13:
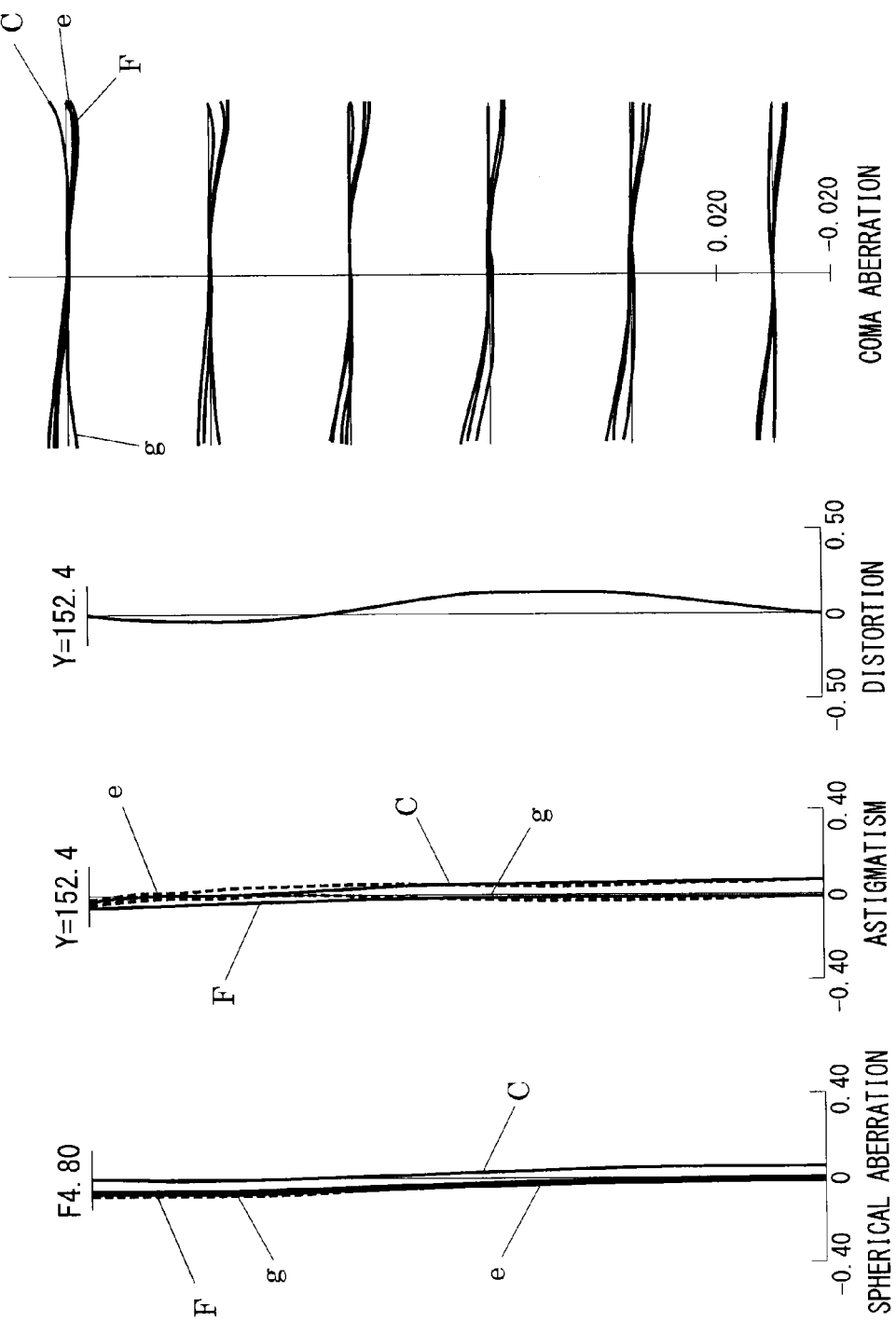
FIG. 13 shows aberrations of the sixth example of the image reading lens in FIG. 6.
Figure 14:
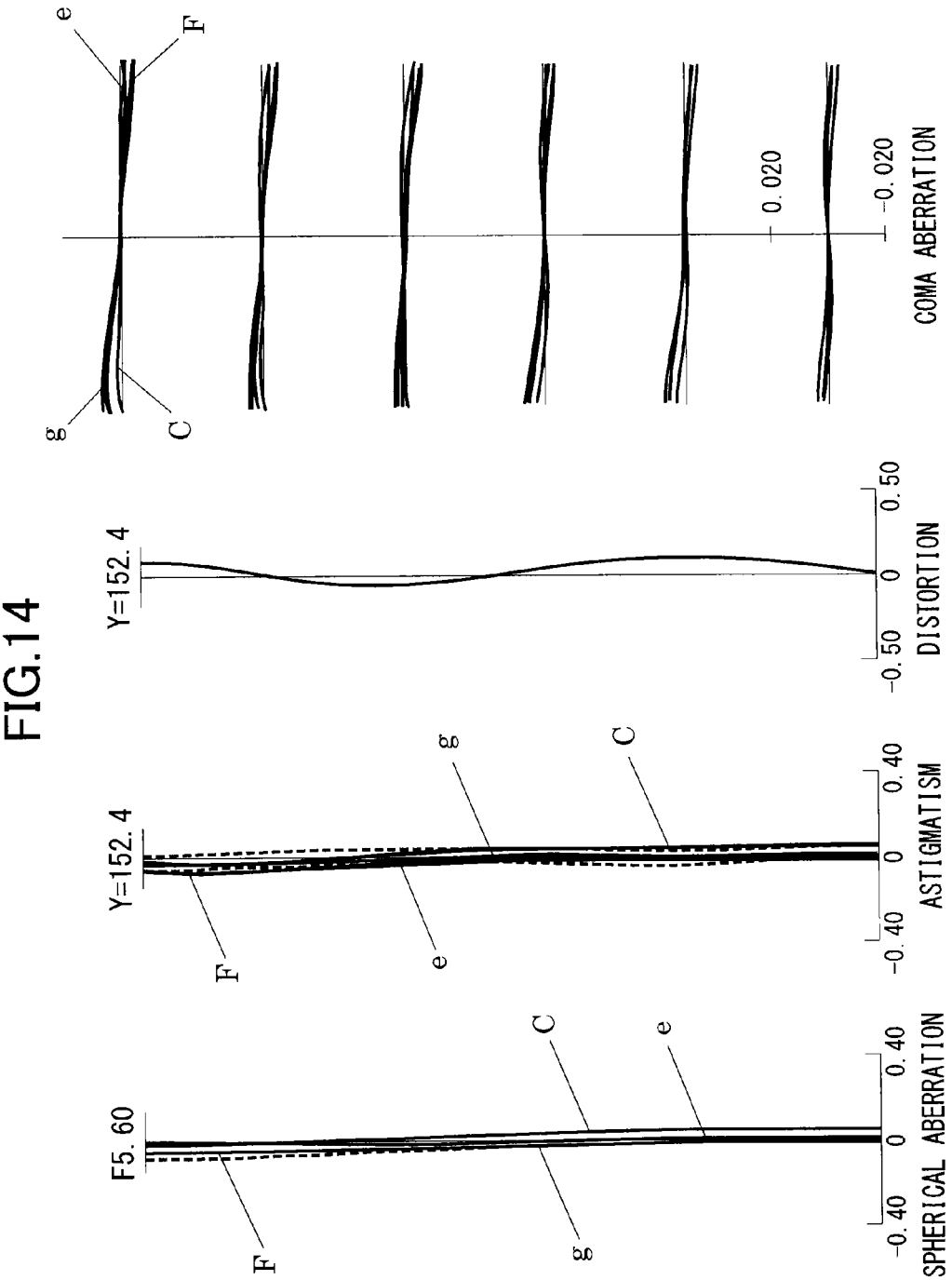
FIG. 14 shows aberrations of the seventh example of the image reading lens in FIG. 7.

Next, first to seventh examples (specific values) of the structure of the image reading lens according to the first embodiment are described. FIG. 1 and FIG. 8 relate to the first example of the image reading lens. FIG. 2 and FIG. 9 relate to the second example of the image reading lens. FIG. 3 and FIG. 10 relate to the third example of the image reading lens. FIG. 4 and FIG. 11 relate to the fourth example of the image reading lens. FIG. 5 and FIG. 12 relate to the fifth example of the image reading lens. FIG. 6 and FIG. 13 relate to the sixth example of the image reading lens. FIG. 7 and FIG. 14 relate to the seventh example of the image reading lens.

The image reading lens according to the first to seventh examples can sufficiently correct aberrations and secure proper imaging performance. In the first to seventh examples codes used are defined as follows.

F: F-number
R: curvature radius
D: surface interval
Ne: refractive index of e-line
νd: Abbe number of e-line
φ: effective diameter of lens surface
K: conical constant of aspherical surface
Y: object height
A4: $4^{th}$-order aspheric coefficient
A6: $6^{th}$-order aspheric coefficient
A8: $8^{th}$-order aspheric coefficient
A10: $10^{th}$-order aspheric coefficient
A12: $12^{th}$-order aspheric coefficient
A14: $14^{th}$-order aspheric coefficient
A16: $16^{th}$-order aspheric coefficient
A18: $18^{th}$-order aspheric coefficient The shapes of aspheric surfaces are represented by the following expression (8):

$$X = \frac{CH^2}{1 + \sqrt{\{1 - (K+1)C^2H^2\}}} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

where C is an inverse number of paraxial curvature radius, H is height from the optical axis, K is a conical constant, and X is an aspheric amount along the optical axis.

First Example

FIG. 1 shows a vertical cross section of the structure of the first example of the image reading lens. The image reading lens comprises first to sixth lenses E1 to E6, an aperture diaphragm AD, a contact glass CTG and a cover glass CVG. From an object side to an image plane, the contact glass CTG, first and second lenses E1 and E2, aperture diaphragm AD, third to sixth lenses E3 to E6, and cover glass CVG are arranged in order. The contact glass CTG is a flat glass plate on which a document is placed. The first lens E1 is a positive biconvex lens having a convex surface at a larger curvature on the object side than the image plane side and having an aspheric surface on the object side. The second lens E2 is a negative biconcave lens having a concave surface at a larger curvature on the image plane side than the object side. The first and second lenses E1 and E2 are tightly adhered to each other to form a cemented lens.

The aperture diaphragm AD is inserted between the second and third lenses E2 and E3. The third lens E3 is a negative meniscus lens having a concave surface on the object side. The fourth lens E4 is a positive biconvex lens having a convex surface at a larger curvature on the image plane side than the object side. The fifth lens E5 is a negative meniscus lens having a concave surface on the object side. The fourth and fifth lenses E4 and E5 are a cemented lens. The first to fifth lenses and aperture diaphragm AD constitute a front lens group Gf. The six lens E6 is a negative meniscus lens having a concave surface on the object side and having aspheric surfaces on both sides, and constitutes a rear lens group Gr. The cover glass CVG is a seal glass plate to protect the surface of a CCD or CMOS (complementary metal-oxide semiconductor) image sensor, and is considered to include various optical filters as lowpass filter, infrared cutoff filter, and dummy glass.

The image reading lens comprises the front and rear lens groups Gf, Gr to form, behind the cover glass CVG, an image of a document placed on the contact glass CTG. In FIG. 1 the surfaces 1 to 15 of the respective lenses are shown. Note that the same numeric codes are used throughout the first to seventh examples for the sake of simplicity, however, the structures of the first to seventh examples in FIGS. 1 to 7 may not be the same. The optical property of the optical elements of the first example is shown in the following Table 1.

onal. Further, when ambient temperature rose from 20° C. to 60° C., an offset of the imaging position of the image reading lens of the first example was −4.0 μm. Since the offset falls in a range of ±10 μm, it can be concluded that image reading accuracy can be properly secured after thermal increase of 20° C. or more.

Second Example

FIG. 2 is a vertical cross section view of the structure of the second example of the image reading lens. The image reading lens comprises first to sixth lenses E1 to E6, an aperture diaphragm AD, a contact glass CTG and a cover glass CVG.

TABLE 1

| FACE NO. | R | D | Ne | νe | φ | REFRACTIVE INDEX-TEMP. COEFFICIENT ($10^{-6}/°$ C.) | LINEAR EXPANSION COEFFICIENT ($10^{-7}/°$ C.) | |
|---|---|---|---|---|---|---|---|---|
| 1 | 0.000 | 3.20 | 1.51825 | 63.93 | | | | CONTACT GLASS |
| 2 | 0.000 | 0.10 | | | | | | |
| 3* | 14.340 | 2.07 | 1.69661 | 52.93 | 8.76 | 3.1 | 76 | 1st LENS |
| 4 | −49.035 | 1.79 | 1.59910 | 38.97 | 7.68 | 2.0 | 84 | 2nd LENS |
| 5 | 11.688 | 0.98 | | | 5.60 | | 236 (ALUMINUM) | |
| 6 | 0.000 | 1.51 | | | 4.75 | | 236 (ALUMINUM) | APERTURE |
| 7 | −41.590 | 1.22 | 1.65222 | 33.53 | 6.62 | 2.1 | 83 | 3rd LENS |
| 8 | −450.000 | 0.20 | | | 7.68 | | 236 (ALUMINUM) | |
| 9 | 30.778 | 3.50 | 1.59732 | 67.37 | 8.42 | −6.1 | 117 | 4th LENS |
| 10 | −7.117 | 1.29 | 1.51825 | 63.93 | 9.40 | 2.7 | 72 | 5th LENS |
| 11 | −17.457 | 15.45 | | | 10.74 | | 192(IRON) | |
| 12* | −11.257 | 4.49 | 1.53342 | 56.15 | 17.68 | −101.0 | 600 | 6th LENS |
| 13* | −77.089 | 1.00 | | | 25.36 | | 192(IRON) | |
| 14 | 0.000 | 0.70 | 1.51825 | 63.93 | | | | COVER GLASS |

In Table 1 lens surfaces with asterisk * added, that is, third, 12$^{th}$, and 13$^{th}$, are aspheric surfaces. The parameters of each aspheric surface are shown in Table 2. In the table En represents a power of 10, ×10n, for example, E-05 represents ×10$^{-5}$.

From an object side to an image plane, the contact glass CTG, first and second lenses E1 and E2, aperture diaphragm AD, third to sixth lenses E3 to E6, and cover glass CVG are arranged in order. The contact glass CTG is a flat glass plate on which a document is placed. The first lens E1 is a positive

TABLE 2

| | K | A4 | A6 | A8 | A10 |
|---|---|---|---|---|---|
| 3 | 0 | −7.58232E−05 | −8.10914E−07 | −1.26258E−08 | 7.49968E−11 |
| 12 | 0 | −1.02389E−04 | 6.47512E−07 | 1.44989E−09 | −2.88058E−11 |
| 13 | 0 | −1.28623E−04 | 7.45131E−07 | −2.50969E−09 | 3.23548E−12 |

The values of the first to seventh conditions are shown in Table 3 and they all satisfy the conditions.

TABLE 3

| | | |
|---|---|---|
| Σ dn$_N$/dt(N) − Σ dn$_P$/dt(P) | (1) | 9.80 |
| fa/f × d$_{11}$/D | (2) | 0.40 |
| (fa/f × d$_{11}$/D)/α | (2A) | 0.21 |
| fb/f | (3) | −0.94 |
| d$_{11}$/D | (4) | 0.48 |
| ν$_P$ − ν$_N$ | (5) | 12.01 |
| R$_3$/R$_{11}$ | (6) | −0.82 |
| (φb − φa)/d$_{11}$ | (7) | 0.45 |

FIG. 8 shows spherical aberration, astigmatism, distortion, and coma aberration of the image reading lens of the first example. In FIGS. 8 to 14 a broken line in the spherical aberration indicates a sine condition, and in the astigmatism a solid line indicates sagittal and a broken line indicates meridibiconvex lens having a convex surface at a larger curvature on the object side than the image plane side and having an aspheric surface on the object side. The second lens E2 is a negative biconcave lens having a concave surface at a larger curvature on the image plane side than the object side. The first and second lenses E1 and E2 are tightly adhered to each other to form a cemented lens.

The aperture diaphragm AD is inserted between the second and third lenses E2 and E3. The third lens E3 is a negative meniscus lens having a concave surface on the object side. The fourth lens E4 is a positive biconvex lens having a convex surface at a larger curvature on the image plane side than the object side. The fifth lens E5 is a negative meniscus lens having a concave surface on the object side. The fourth and fifth lenses E4 and E5 are a cemented lens. The first to fifth lenses and aperture diaphragm AD constitute a front lens group Gf. The six lens E6 is a negative meniscus lens having a concave surface on the object side and having aspheric surfaces on both sides, and constitutes a rear lens group Gr. The cover glass CVG is a seal glass plate to protect the surface of a CCD image sensor or CMOS (complementary metal-oxide semiconductor), and is considered to include various optical filters as lowpass filter, infrared cutoff filter, and dummy glass.

The image reading lens comprises the front lens group Gf of the first to fifth lenses E1 to E5 and the rear lens group Gr of the sixth lens E6 to form an image of a document placed on the contact glass CTG behind the cover glass CVG. In FIG. 2 the surfaces 1 to 15 of the respective lenses are shown. The optical property of the optical elements of the first example is shown in the following Table 4.

TABLE 4

| | R | D | Ne | νe | φ | REFRACTIVE INDEX-TEMP. COEFFICIENT ($10^{-6}$/° C.) | LINEAR EXPANSION COEFFICIENT ($10^{-7}$/° C.) | |
|---|---|---|---|---|---|---|---|---|
| 1 | 0.000 | 3.20 | 1.51825 | 63.93 | | | | CONTACT GLASS |
| 2 | 0.000 | 0.10 | | | | | | |
| 3* | 12.486 | 2.34 | 1.62112 | 63.55 | 8.74 | −3.0 | 106 | 1st LENS |
| 4 | −37.059 | 1.84 | 1.58481 | 40.61 | 7.48 | 3.1 | 79 | 2nd LENS |
| 5 | 12.412 | 0.43 | | | 5.32 | | 236 (ALUMINUM) | |
| 6 | 0.000 | 1.92 | | | 5.07 | | 236 (ALUMINUM) | APERTURE |
| 7 | −22.968 | 1.20 | 1.62409 | 35.99 | 7.28 | 2.6 | 81 | 3rd LENS |
| 8 | −45.121 | 0.10 | | | 8.40 | | 236 (ALUMINUM) | |
| 9 | 43.522 | 2.93 | 1.62033 | 63.02 | 9.16 | −3.8 | 101 | 4th LENS |
| 10 | −10.893 | 1.20 | 1.51825 | 63.93 | 10.14 | 2.7 | 72 | 5th LENS |
| 11 | −16.111 | 14.50 | | | 11.08 | | 192(IRON) | |
| 12* | −10.185 | 2.50 | 1.53342 | 56.15 | 17.38 | −101.0 | 600 | 6th LENS |
| 13* | −50.220 | 1.00 | | | 23.00 | | 192(IRON) | |
| 14 | 0.000 | 0.55 | 1.51825 | 63.93 | | | | COVER GLASS |
| 15 | 0.000 | BF | | | | | | |

In Table 4 lens surfaces with asterisk * added, that is, third, $12^{th}$, and $13^{th}$, are aspheric surfaces. The parameters of each aspheric surface are shown in Table 5. In the table En represents a power of 10, ×10n, for example, E-05 represents $\times 10^{-5}$.

of the first example was −1.4 μm. Since the offset falls in a range of ±10 μm, it can be concluded that image reading accuracy can be properly secured after a thermal increase of 20° C. or more.

Third Example

FIG. 3 is a vertical cross section view of the structure of the third example of the image reading lens. The image reading lens comprises first to sixth lenses E1 to E6, an aperture diaphragm AD, a contact glass CTG and a cover glass CVG. From an object side to an image plane, the contact glass CTG, first and second lenses E1 and E2, aperture diaphragm AD, third to sixth lenses E3 to E6, and cover glass CVG are arranged in order. The contact glass CTG is a flat glass plate on which a document is placed. The first lens E1 is a positive biconvex lens having a convex surface at a larger curvature on the object side than the image plane side and having an

TABLE 5

| | K | A4 | A6 | A8 | A10 | A12 | A14 | A16 | A18 |
|---|---|---|---|---|---|---|---|---|---|
| 3 | 0 | −6.61985E−05 | −1.58893E−06 | 1.20499E−08 | −5.42083E−10 | | | | |
| 12 | 0 | −2.17807E−04 | 2.56234E−06 | 1.04593E−07 | −4.47815E−09 | 7.90745E−11 | −6.97115E−13 | 2.88230E−15 | −3.32976E−18 |
| 13 | 0 | −2.90292E−04 | 5.21704E−05 | −6.94221E−08 | 6.68900E−10 | −4.70991E−12 | 2.38410E−14 | −7.65698E−17 | 1.12278E−19 |

The values of the first to seventh conditions are shown in Table 6 and they all satisfy the conditions.

TABLE 6

| | | |
|---|---|---|
| $\Sigma\, dn_N/dt(N) - \Sigma\, dn_P/dt(P)$ | (1) | 15.20 |
| $fa/f \times d_{11}/D$ | (2) | 0.42 |
| $(fa/f \times d_{11}/D)/\alpha$ | (2A) | 0.22 |
| $fb/f$ | (3) | −0.91 |
| $d_{11}/D$ | (4) | 0.50 |
| $v_P - v_N$ | (5) | 14.12 |
| $R_3/R_{11}$ | (6) | −0.77 |
| $(\phi b - \phi a)/d_{11}$ | (7) | 0.43 |

FIG. 9 shows spherical aberration, astigmatism, distortion, and coma aberration of the image reading lens of the second example. When ambient temperature rose from 20° C. to 60° C., an offset of the imaging position of the image reading lens aspheric surface on the object side. The second lens E2 is a negative biconcave lens having a concave surface at a larger curvature on the image plane side than the object side. The first and second lenses E1 and E2 are a cemented lens.

The aperture diaphragm AD is inserted between the second and third lenses E2 and E3. The third lens E3 is a negative meniscus lens having a concave surface on the object side. The fourth lens E4 is a positive biconvex lens having a convex surface at a larger curvature on the image plane side than the object side. The fifth lens E5 is a negative meniscus lens having a concave surface on the object side. The fourth and fifth lenses E4 and E5 are a cemented lens. The first to fifth lenses and aperture diaphragm AD constitute a front lens group Gf. The six lens E6 is a negative meniscus lens having a concave surface on the object side and having aspheric surfaces on both sides, and constitutes a rear lens group Gr. The cover glass CVG is a seal glass plate to protect the surface of a CCD image sensor or CMOS (complementary metal-oxide semiconductor), and is considered to include various optical filters as lowpass filter, infrared cutoff filter, and dummy glass.

The image reading lens comprises the front lens group Gf of the first to fifth lenses E1 to E5 and the rear lens group Gr of the sixth lens E6 to form an image of a document placed on the contact glass CTG behind the cover glass CVG. In FIG. 1 the surfaces 1 to 15 of the respective lenses are shown. The optical property of the optical elements of the third example is shown in the following Table 7.

TABLE 7

| | R | D | Ne | νe | φ | REFRACTIVE INDEX-TEMP. COEFFICIENT ($10^{-6}$/° C.) | LINEAR EXPANSION COEFFICIENT ($10^{-7}$/° C.) | |
|---|---|---|---|---|---|---|---|---|
| 1 | 0.000 | 3.20 | 1.51825 | 63.93 | | | | CONTACT GLASS |
| 2 | 0.000 | 0.10 | | | | | | |
| 3* | 12.740 | 2.32 | 1.62112 | 63.55 | 8.72 | −3.0 | 106 | 1st LENS |
| 4 | −36.238 | 1.70 | 1.58481 | 40.61 | 7.48 | 3.1 | 79 | 2nd LENS |
| 5 | 13.303 | 0.48 | | | 5.48 | | 236 (ALUMINUM)) | |
| 6 | 0.000 | 1.73 | | | 5.16 | | 236 (ALUMINUM) | APERTURE |
| 7 | −16.542 | 1.20 | 1.67765 | 31.84 | 6.94 | 2.8 | 79 | 3rd LENS |
| 8 | −23.934 | 0.10 | | | 8.02 | | 236 (ALUMINUM) | |
| 9 | 57.257 | 2.77 | 1.62033 | 63.02 | 8.84 | −3.8 | 101 | 4th LENS |
| 10 | −10.858 | 1.20 | 1.51825 | 63.93 | 9.78 | 2.7 | 72 | 5th LENS |
| 11 | −16.263 | 14.81 | | | 10.70 | | 192(IRON) | |
| 12* | −9.610 | 2.50 | 1.53342 | 56.15 | 17.12 | −101.0 | 600 | 6th LENS |
| 13* | −37.256 | 1.00 | | | 22.66 | | 192(IRON) | |
| 14 | 0.000 | 0.55 | 1.51825 | 63.93 | | | | COVER GLASS |
| 15 | 0.000 | BF | | | | | | |

In Table 7 lens surfaces with asterisk * added, that is, third, 12$^{th}$, and 13$^{th}$, are aspheric surfaces. The parameters of each aspheric surface are shown in Table 8. In the table En represents a power of 10, ×10n, for example, E-05 represents ×10$^{-5}$.

TABLE 8

| | K | A4 | A6 | A8 | A10 | A12 | A14 | A16 | A18 |
|---|---|---|---|---|---|---|---|---|---|
| 3 | 0 | −6.36650E−05 | −1.53898E−06 | 1.56833E−08 | −6.04224E−10 | | | | |
| 12 | 0 | −1.75898E−04 | 5.44761E−07 | 1.51153E−07 | −3.89474E−09 | 3.22221E−11 | 2.49807E−13 | −5.73080E−15 | 2.79903E−17 |
| 13 | 0 | −2.57509E−04 | 3.55790E−06 | −2.86895E−08 | 9.09331E−11 | 2.06326E−13 | −8.85515E−16 | −7.98446E−18 | 2.85013E−20 |

The values of the first to seventh conditions are shown in Table 9 and they all satisfy the conditions.

TABLE 9

| $\Sigma\, dn_N/dt(N) - \Sigma\, dn_P/dt(P)$ | (1) | 15.40 |
|---|---|---|
| $fa/f \times d_{11}/D$ | (2) | 0.42 |
| $(fa/f \times_{11}/D)/\alpha$ | (2A) | 0.22 |
| $fb/f$ | (3) | −0.93 |
| $d_{11}/D$ | (4) | 0.51 |
| $\nu_P - \nu_N$ | (5) | 15.15 |
| $R_3/R_{11}$ | (6) | −0.78 |
| $(\phi b - \phi a)/d_{11}$ | (7) | 0.43 |

FIG. 10 shows spherical aberration, astigmatism, distortion, and coma aberration of the image reading lens of the third example. When ambient temperature rose from 2020 C. to 60 ° C., an offset of the imaging position of the image reading lens of the first example was −2.0 μm. Since the offset falls in a range of ±10 μm, it can be concluded that image reading accuracy can be properly secured after a thermal increase of to 20° C. or more.

Fourth Example

FIG. 4 is a vertical cross section view of the structure of the fourth example of the image reading lens. The image reading lens comprises first to sixth lenses E1 to E6, an aperture diaphragm AD, a contact glass CTG and a cover glass CVG. From an object side to an image plane, the contact glass CTG, first and second lenses E1 and E2, aperture diaphragm AD, third to sixth lenses E3 to E6, and cover glass CVG are arranged in order. The contact glass CTG is a flat glass plate on which a document is placed. The first lens E1 is a positive biconvex lens having a convex surface at a larger curvature on the object side than the image plane side and having an aspheric surface on the object side. The second lens E2 is a negative biconcave lens having a concave surface at a larger curvature on the image plane side than the object side. The first and second lenses E1 and E2 are a cemented lens.

The aperture diaphragm AD is inserted between the second and third lenses E2 and E3. The third lens E3 is a negative meniscus lens having a concave surface on the object side. The fourth lens E4 is a positive biconvex lens having a convex surface at a larger curvature on the image plane side than the object side. The fifth lens E5 is a negative meniscus lens having a concave surface on the object side. The fourth and fifth lenses E4 and E5 are a cemented lens. The first to fifth lenses and aperture diaphragm AD constitute a front lens group Gf. The six lens E6 is a biconcave lens having a concave surface on the object side at a larger curvature than the image-plane side and having aspheric surfaces on both sides, and constitutes a rear lens group Gr. The six lens E6 of the fourth example is different from the negative meniscus lens of the other examples. The cover glass CVG is a seal glass plate to protect the surface of a CCD image sensor or CMOS (complementary metal-oxide semiconductor), and is considered to include various optical filters as lowpass filter, infrared cutoff filter, and dummy glass.

The image reading lens comprises the front lens group Gf of the first to fifth lenses E1 to E5 and the rear lens group Gr of the sixth lens E6 to form an image of a document placed on the contact glass CTG behind the cover glass CVG. The optical property of the optical elements of the fourth example is shown in the following Table 10.

TABLE 10

|   | R | D | Ne | υe | φ | REFRACTIVE INDEX-TEMP. COEFFICIENT ($10^{-6}$/° C.) | LINEAR EXPANSION COEFFICIENT ($10^{-7}$/° C.) |   |
|---|---|---|---|---|---|---|---|---|
| 1 | 0.000 | 3.20 | 1.51825 | 63.93 |  |  |  | CONTACT GLASS |
| 2 | 0.000 | 0.10 |  |  |  |  |  |  |
| 3* | 14.149 | 2.60 | 1.62112 | 63.55 | 9.72 | −3.0 | 106 | 1st LENS |
| 4 | −24.733 | 2.08 | 1.54344 | 46.90 | 8.44 | 1.4 | 82 | 2nd LENS |
| 5 | 12.611 | 0.89 |  |  | 5.78 |  | 236 (ALUMINUM) |  |
| 6 | 0.000 | 1.67 |  |  | 4.99 |  | 236 (ALUMINUM) | APERTURE |
| 7 | −19.681 | 1.29 | 1.85504 | 23.59 | 6.86 | 1.0 | 88 | 3rd LENS |
| 8 | −29.192 | 0.10 |  |  | 7.94 |  | 236 (ALUMINUM) |  |
| 9 | 63.966 | 2.79 | 1.62033 | 63.02 | 8.68 | −3.8 | 101 | 4th LENS |
| 10 | −10.620 | 1.20 | 1.51825 | 63.93 | 9.72 | 2.7 | 72 | 5th LENS |
| 11 | −15.852 | 17.06 |  |  | 10.70 |  | 192(IRON) |  |
| 12* | −15.771 | 2.91 | 1.53342 | 56.15 | 19.50 | −101.0 | 600 | 6th LENS |
| 13* | 90.990 | 1.00 |  |  | 25.86 |  | 192(IRON) |  |
| 14 | 0.000 | 0.55 | 1.51825 | 63.93 |  |  |  | COVER GLASS |
| 15 | 0.000 | BF |  |  |  |  |  |  |

In Table 10 lens surfaces with asterisk * added, that is, third, $12^{th}$, and $13^{th}$, are aspheric surfaces. The parameters of each aspheric surface are shown in Table 11. In the table En represents a power of 10, ×10n, for example, E-05 represents $\times 10^{-5}$.

TABLE 11

|  | K | A4 | A6 | A8 | A10 | A12 | A14 | A16 | A18 |
|---|---|---|---|---|---|---|---|---|---|
| 3 | 0 | −6.86268E−05 | −7.32142E−07 | −1.07857E−08 | 4.74992E−11 |  |  |  |  |
| 12 | 0 | −3.63611E−04 | 6.74654E−06 | −8.25931E−08 | 1.74424E−10 | 7.78468E−12 | −8.67121E−14 | 3.24097E−16 | −2.72124E−19 |
| 13 | 0 | −3.75176E−04 | 5.44843E−06 | −5.29070E−08 | 2.79281E−10 | −4.69892E−13 | −2.34039E−15 | 1.26381E−17 | −1.77459E−20 |

The values of the first to seventh conditions are shown in Table 12 and they all satisfy the conditions.

TABLE 12

| Σ $dn_N/dt(N)$ − Σ $dn_P/dt(P)$ | (1) | 11.90 |
|---|---|---|
| fa/f × $d_{11}$/D | (2) | 0.48 |
| (fa/f × $_{11}$/D)/α | (2A) | 0.25 |
| fb/f | (3) | −0.94 |
| $d_{11}$/D | (4) | 0.52 |
| $v_P − v_N$ | (5) | 15.64 |
| $R_3/R_{11}$ | (6) | −0.89 |
| (φb − φa)/$d_{11}$ | (7) | 0.52 |

FIG. 11 shows spherical aberration, astigmatism, distortion, and coma aberration of the image reading lens of the fourth example. When ambient temperature rose from 20° C. to 60° C., an offset of the imaging position of the image reading lens of the first example was +2.2 μm. Since the offset falls in a range of ±10 μm, it can be concluded that image reading accuracy can be properly secured after a thermal increases of 20° C. or more.

Fifth Example

FIG. 5 is a vertical cross section view of the structure of the fifth example of the image reading lens. The image reading lens comprises first to sixth lenses E1 to E6, an aperture diaphragm AD, a contact glass CTG and a cover glass CVG. From an object side to an image plane, the contact glass CTG, first and second lenses E1 and E2, aperture diaphragm AD, third to sixth lenses E3 to E6, and cover glass CVG are arranged in order. The contact glass CTG is a flat glass plate on which a document is placed. The first lens E1 is a positive biconvex lens having a convex surface at a larger curvature on the object side than the image plane side and having an aspheric surface on the object side. The second lens E2 is a negative biconcave lens having a concave surface at a larger curvature on the image plane side than the object side. The first and second lenses E1 and E2 are a cemented lens. The aperture diaphragm AD is inserted between the second and third lenses E2 and E3. The third lens E3 is a negative meniscus lens having a concave surface on the object side. The fourth lens E4 is a positive biconvex lens having a convex surface at a larger curvature on the image plane side than the object side. The fifth lens E5 is a negative meniscus lens having a concave surface on the object side. The fourth and fifth lenses E4 and E5 are a cemented lens. The first to fifth lenses and aperture diaphragm AD constitute a front lens group Gf. The six lens E6 is a negative meniscus lens having a concave surface on the object side and having aspheric surfaces on both sides, and constitutes a rear lens group Gr. The cover glass CVG is a seal glass plate to protect the surface of a CCD image sensor or CMOS (complementary metal-oxide semiconductor), and is considered to include various optical filters as lowpass filter, infrared cutoff filter, and dummy glass.

The image reading lens comprises the front lens group Gf of the first to fifth lenses E1 to E5 and the rear lens group Gr of the sixth lens E6 to form an image of a document placed on the contact glass CTG behind the cover glass CVG. The optical property of the optical elements of the fifth example is shown in the following Table 13.

Sixth Example

FIG. 6 is a vertical cross section view of the structure of the sixth example of the image reading lens. The image reading lens comprises first to sixth lenses E1 to E6, an aperture diaphragm AD, a contact glass CTG and a cover glass CVG. From an object side to an image plane, the contact glass CTG, first and second lenses E1 and E2, aperture diaphragm AD, third to sixth lenses E3 to E6, and cover glass CVG are

TABLE 13

|  | R | D | Ne | υe | φ | REFRACTIVE INDEX-TEMP. COEFFICIENT $(10^{-6}/° C)$ | LINEAR EXPANSION COEFFICIENT $(10^{-7}/° C.)$ | |
|---|---|---|---|---|---|---|---|---|
| 1 | 0.000 | 3.20 | 1.51825 | 63.93 | | | | CONTACT GLASS |
| 2 | 0.000 | 0.10 | | | | | | |
| 3* | 14.149 | 2.60 | 1.62112 | 63.55 | 9.72 | −3.0 | 106 | 1st LENS |
| 4 | −24.733 | 2.08 | 1.54344 | 46.90 | 8.44 | 1.4 | 82 | 2nd LENS |
| 5 | 12.611 | 0.89 | | | 5.78 | | 236 (ALUMINUM) | |
| 6 | 0.000 | 1.67 | | | 4.99 | | 236 (ALUMINUM) | APERTURE |
| 7 | −19.681 | 1.29 | 1.85504 | 23.59 | 6.86 | 1.0 | 88 | 3rd LENS |
| 8 | −29.192 | 0.10 | | | 7.94 | | 236 (ALUMINUM) | |
| 9 | 63.966 | 2.79 | 1.62033 | 63.02 | 8.68 | −3.8 | 101 | 4th LENS |
| 10 | −10.620 | 1.20 | 1.51825 | 63.93 | 9.72 | 2.7 | 72 | 5th LENS |
| 11 | −15.852 | 17.06 | | | 10.70 | | 192(IRON) | |
| 12* | −15.771 | 2.91 | 1.53342 | 56.15 | 19.50 | −101.0 | 600 | 6th LENS |
| 13* | 90.990 | 1.00 | | | 25.86 | | 192(IRON) | |
| 14 | 0.000 | 0.55 | 1.51825 | 63.93 | | | | COVER GLASS |
| 15 | 0.000 | BF | | | | | | |

In Table 13 lens surfaces with asterisk * added, that is, third, $12^{th}$, and $13^{th}$, are aspheric surfaces. The parameters of each aspheric surface are shown in Table 14. In the table En represents a power of 10, ×10n, for example, E-05 represents $×10^{-5}$.

arranged in order. The contact glass CTG is a flat glass plate on which a document is placed. The first lens E1 is a positive biconvex lens having a convex surface at a larger curvature on the object side than the image plane side and having an aspheric surface on the object side. The second lens E2 is a

TABLE 14

|  | K | A4 | A6 | A8 | A10 | A12 | A14 | A16 | A18 |
|---|---|---|---|---|---|---|---|---|---|
| 3 | 0 | −6.71522E−05 | −6.82443E−07 | −1.05725E−08 | 7.33608E−11 | | | | |
| 12 | 0 | −1.19598E−04 | 8.44310E−07 | 1.75328E−08 | −2.75162E−10 | 1.84726E−12 | 5.86594E−15 | −1.68096E−16 | 9.46272E−19 |
| 13 | 0 | −1.73834E−04 | 1.20893E−06 | −4.56851E−09 | 7.75181E−12 | | | | |

The values of the first to seventh conditions are shown in Table 15 and they all satisfy the conditions.

TABLE 15

| Σ $dn_N/dt(N)$ − Σ $dn_P/dt(P)$ | (1) | 11.10 |
|---|---|---|
| $fa/f × d_{11}/D$ | (2) | 0.45 |
| $(fa/f × _{11}/D)/α$ | (2A) | 0.23 |
| fb/f | (3) | −0.96 |
| $d_{11}/D$ | (4) | 0.51 |
| $v_P − v_N$ | (5) | 16.70 |
| $R_3/R_{11}$ | (6) | −0.93 |
| $(φb − φa)/d_{11}$ | (7) | 0.47 |

FIG. 12 shows spherical aberration, astigmatism, distortion, and coma aberration of the image reading lens of the fifth example. When ambient temperature rose from 20° C. to ° C., an offset of the imaging position of the image reading lens of the fifth example was −2.6 μm. Since the offset falls in a range of ±10μm, it can be concluded that image reading accuracy can be properly secured after a thermal increases of 20° C. or more.

negative biconcave lens having a concave surface at a larger curvature on the image plane side than the object side. The first and second lenses E1 and E2 are a cemented lens.

The aperture diaphragm AD is inserted between the second and third lenses E2 and E3. The third lens E3 is a negative meniscus lens having a concave surface on the object side. The fourth lens E4 is a positive biconvex lens having a convex surface at a larger curvature on the image plane side than the object side. The fifth lens E5 is a negative meniscus lens having a concave surface on the object side. The fourth and fifth lenses E4 and E5 are a cemented lens. The first to fifth lenses and aperture diaphragm AD constitute a front lens group Gf. The six lens E6 is a negative meniscus lens having a concave surface on the object side and having aspheric surfaces on both sides, and constitutes a rear lens group Gr. The cover glass CVG is a seal glass plate to protect the surface of a CCD image sensor or CMOS (complementary metal-oxide semiconductor), and is considered to include various optical filters as lowpass filter, infrared cutoff filter, and dummy glass.

The image reading lens comprises the front lens group Gf of the first to fifth lenses E1 to E5 and the rear lens group Gr of the sixth lens E6 to form an image of a document placed on the contact glass CTG behind the cover glass CVG. In FIG. 6 the surfaces 1 to 15 of the respective lenses are shown. The optical property of the optical elements of the sixth example is shown in the following Table 16.

TABLE 16

| | R | D | Ne | νe | φ | REFRACTIVE INDEX-TEMP. COEFFICIENT ($10^{-6}$/° C.) | LINEAR EXPANSION COEFFICIENT ($10^{-7}$/° C.) | |
|---|---|---|---|---|---|---|---|---|
| 1 | 0.000 | 3.20 | 1.51825 | 63.93 | | | | CONTACT GLASS |
| 2 | 0.000 | 0.10 | | | | | | |
| 3* | 14.150 | 2.41 | 1.68084 | 54.64 | 9.22 | 2.5 | 76 | 1st LENS |
| 4 | −25.400 | 1.54 | 1.58482 | 40.47 | 8.04 | 3.3 | 74 | 2nd LENS |
| 5 | 12.222 | 1.10 | | | 5.92 | | 236 (ALUMINUM) | |
| 6 | 0.000 | 1.59 | | | 4.91 | | 236 (ALUMINUM) | APERTURE |
| 7 | −26.225 | 1.79 | 1.65222 | 33.53 | 6.74 | 2.1 | 83 | 3rd LENS |
| 8 | −57.777 | 0.10 | | | 8.28 | | 236 (ALUMINUM) | |
| 9 | 44.961 | 3.26 | 1.59732 | 67.37 | 8.94 | −6.1 | 117 | 4th LENS |
| 10 | −8.582 | 1.20 | 1.51825 | 63.87 | 9.92 | 4.7 | 58 | 5th LENS |
| 11 | −16.562 | 15.63 | | | 11.08 | | 192(IRON) | |
| 12* | −12.012 | 3.00 | 1.53342 | 56.15 | 18.28 | −101.0 | 600 | 6th LENS |
| 13* | −83.073 | 1.00 | | | 24.32 | | 192(IRON) | |
| 14 | 0.000 | 0.55 | 1.51825 | 63.93 | | | | COVER GLASS |
| 15 | 0.000 | BF | | | | | | |

In Table 16 lens surfaces with asterisk * added, that is, third, $12^{th}$, and $13^{th}$ are aspheric surfaces. The parameters of each aspheric surface are shown in Table 17. In the table En represents a power of 10, ×10n, for example, E-05 represents ×$10^{-5}$.

TABLE 17

| | K | A4 | A6 | A8 | A10 |
|---|---|---|---|---|---|
| 3 | 0 | −7.05971E−05 | −6.86984E−07 | −1.46708E−08 | 1.23391E−10 |
| 12 | 0 | −1.32777E−04 | 6.35657E−07 | 3.56712E−09 | −1.68535E−11 |
| 13 | 0 | −1.44080E−04 | 7.73115E−07 | −1.84594E−09 | 1.47781E−12 |

The values of the first to seventh conditions are shown in Table 18 and they all satisfy the conditions.

TABLE 18

| | | |
|---|---|---|
| $\Sigma\, dn_N/dt(N) - \Sigma\, dn_P/dt(P)$ | (1) | 13.70 |
| $fa/f \times d_{11}/D$ | (2) | 0.42 |
| $(fa/f \times d_{11}/D)/\alpha$ | (2A) | 0.22 |
| $fb/f$ | (3) | −0.99 |
| $d_{11}/D$ | (4) | 0.49 |
| $\nu_P - \nu_N$ | (5) | 12.50 |
| $R_3/R_{11}$ | (6) | −0.85 |
| $(\phi b - \phi a)/d_{11}$ | (7) | 0.46 |

FIG. 13 shows spherical aberration, astigmatism, distortion, and coma aberration of the image reading lens of the sixth example. When ambient temperature rose from 20° C. to 60 C., an offset of the imaging position of the image reading lens of the sixth example was −2.5 μm. Since the offset falls in a range of ±10 μm, it can be concluded that image reading accuracy can be properly secured after a thermal increase of 20° C. or more.

Seventh Example

FIG. 7 is a vertical cross section view of the structure of the seventh example of the image reading lens. The image reading lens comprises first to sixth lenses E1 to E6, an aperture diaphragm AD, a contact glass CTG and a cover glass CVG. From an object side to an image plane, the contact glass CTG, first and second lenses E1 and E2, aperture diaphragm AD, third to sixth lenses E3 to E6, and cover glass CVG are arranged in order. The contact glass CTG is a flat glass plate on which a document is placed. The first lens E1 is a positive biconvex lens having a convex surface at a larger curvature on the object side than the image plane side and having an aspheric surface on the object side. The second lens E2 is a negative biconcave lens having a concave surface at a larger curvature on the image plane side than the object side. The first and second lenses E1 and E2 are a cemented lens.

The aperture diaphragm AD is inserted between the second and third lenses E2 and E3. The third lens E3 is a negative meniscus lens having a concave surface on the object side. The fourth lens E4 is a positive biconvex lens having a convex surface at a larger curvature on the image plane side than the object side. The fifth lens E5 is a negative meniscus lens having a concave surface on the object side. The fourth and fifth lenses E4 and E5 are a cemented lens. The first to fifth lenses and aperture diaphragm AD constitute a front lens group Gf. The six lens E6 is a negative meniscus lens having a concave surface on the object side and having aspheric surfaces on both sides, and constitutes a rear lens group Gr. The cover glass CVG is a seal glass plate to protect the surface of a CCD image sensor or CMOS (complementary metal-oxide semiconductor), and is considered to include various optical filters as lowpass filter, infrared cutoff filter, and dummy glass.

The image reading lens comprises the front lens group Gf of the first to fifth lenses E1 to E5 and the rear lens group Gr of the sixth lens E6 to form an image of a document placed on the contact glass CTG behind the cover glass CVG. The optical property of the optical elements of the seventh example is shown in the following Table 19.

TABLE 19

| FACE NO. | R | D | Ne | νe | φ | REFRACTIVE INDEX-TEMP. COEFFICIENT ($10^{-6}$/° C.) | LINEAR EXPANSION COEFFICIENT ($10-7$/° C.) | |
|---|---|---|---|---|---|---|---|---|
| 1 | 0.000 | 3.20 | 1.51825 | 63.93 | | | | CONTACT GLASS |
| 2 | 0.000 | 0.10 | | | | | | |
| 3 | 14.314 | 2.00 | 1.72056 | 47.64 | 7.00 | −0.3 | 80 | 1st LENS |
| 4 | −28.797 | 1.20 | 1.63003 | 35.43 | 5.84 | 2.5 | 81 | 2nd LENS |
| 5 | 21.598 | 0.26 | | | 4.56 | | 236 (ALUMINUM) | |
| 6 | 0.000 | 1.73 | | | 4.28 | | 236 (ALUMINUM) | APERTURE |
| 7 | −12.003 | 2.72 | 1.85504 | 23.59 | 5.82 | 1.0 | 88 | 3rd LENS |
| 8 | −14.338 | 0.10 | | | 7.82 | | 236 (ALUMINUM) | |
| 9 | 65.663 | 3.41 | 1.59732 | 67.37 | 8.60 | −6.1 | 117 | 4th LENS |
| 10 | −7.060 | 2.65 | 1.67000 | 48.04 | 9.40 | 4.0 | 69 | 5th LENS |
| 11 | −21.724 | 14.67 | | | 11.46 | | 192(IRON) | |
| 12* | −10.975 | 3.00 | 1.53342 | 56.15 | 17.42 | −101.0 | 600 | 6th LENS |
| 13* | −85.796 | 1.00 | | | 23.82 | | 192(IRON) | |
| 14 | 0.000 | 0.55 | 1.51825 | 63.93 | | | | COVER GLASS |
| 15 | 0.000 | BF | | | | | | |

In Table 19 lens surfaces with asterisk * added, that is, the $12^{th}$ and $13^{th}$, are aspheric surfaces. The parameters of each aspheric surface are shown in Table 20. In the table En represents a power of 10, $\times 10n$, for example, E-05 represents $\times 10^{-5}$.

TABLE 20

| | K | A4 | A6 | A8 | A10 |
|---|---|---|---|---|---|
| 12 | 0 | −2.65561E−04 | 6.89556E−07 | 1.36119E−08 | −1.15834E−10 |
| 13 | 0 | −2.70971E−04 | 1.59564E−06 | −4.95268E−09 | 5.52420E−12 |

The values of the first to seventh conditions are shown in Table 21 and they all satisfy the conditions.

TABLE 21

| | | |
|---|---|---|
| $\Sigma\, dn_N/dt(N) - \Sigma\, dn_P/dt(P)$ | (1) | 13.90 |
| $fa/f \times d_{11}/D$ | (2) | 0.39 |
| $(fa/f \times _{11}/D)/\alpha$ | (2A) | 0.20 |
| $fb/f$ | (3) | −0.90 |
| $d_{11}/D$ | (4) | 0.46 |
| $v_P - v_N$ | (5) | 16.70 |
| $R_3/R_{11}$ | (6) | −0.66 |
| $(\phi b - \phi a)/d_{11}$ | (7) | 0.41 |

FIG. 14 shows spherical aberration, astigmatism, distortion, and coma aberration of the image reading lens of the seventh example. When ambient temperature rose from 20° C. to 60° C., an offset of the imaging position of the image reading lens of the seventh example was +2.4 μm. Since the offset falls in a range of +10 μm, it can be concluded that image reading accuracy can be properly secured after a thermal increases of 20° C. or more.

Second Embodiment

Figure 15:
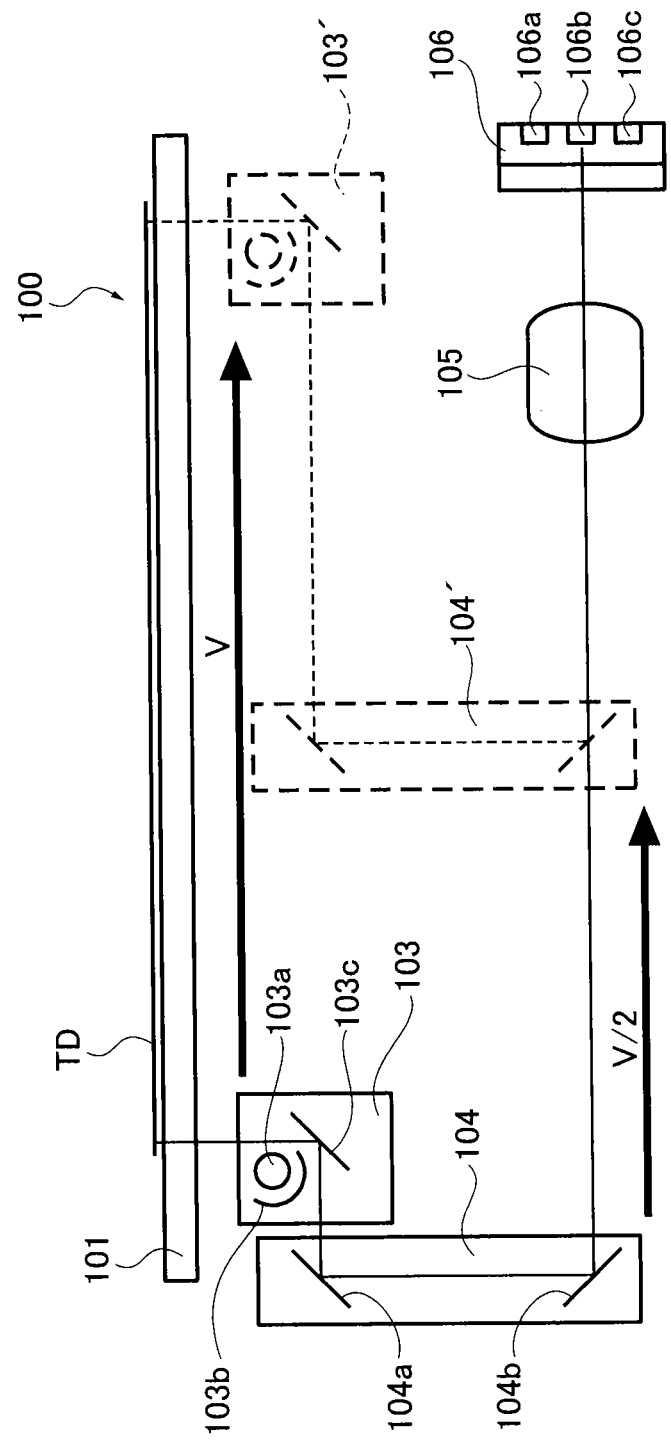
FIG. 15 is a cross section view of the essential part of an image reading device according to a second embodiment.

Next, an image reading device incorporating the image reading lens as an imaging forming lens according to any of the first to seventh example is described. FIG. 15 is a vertical cross section view of the image reading device according to the second embodiment. An image reading device 100 in FIG. 15 comprises a contact glass 101, a first carrier 103, a second carrier 104, an image reading lens 105, and a line sensor 106. The first carrier 103 includes a light source 103a, a light source mirror 103b, and a first mirror 103c and the second carrier 104 includes a second mirror 104a and a third mirror 104b. The line sensor 106 includes photoelectric conversion elements 106a, 106b, 106 with red (R), green (G), and blue (B) filters as a color separator, which are arranged in three lines on a chip to form a three-line CCD line sensor. The image reading lens 105 is the one according to the first embodiment.

In FIG. 15 an original document TD as a reading subject is placed on the contact glass 100 with an image-side placed down. The first carrier 103 is provided below the contact glass 101 to support the light source 103a, light source mirror 103b, and first mirror 103c and move to a position 103' indicated by the broken line at a constant speed V. The light source 103a extends long in a direction orthogonal to the drawing and can be a halogen lamp, xenon lamp, fluorescent lamp as cold-cathode tube, one in which point sources like LEDs are arranged in row, a linear light source using an optical guide to convert point source to linear source, or a long surface light source as organic EL (electro-luminescence). The light source 103a is controlled to emit light when the first carrier 103 moves rightward in FIG. 15. The light therefrom is guided by the light source mirror 103b of a long semi-cylindrical shape and illuminates a slit-like portion of the original document TD on the contact glass 101. The slit-like portion is long in a main scanning direction which is orthogonal to the drawing.

The surface of the first mirror 103c is tilted at 45 degrees relative to a mount surface of the contact glass 101 in the first carrier 103. The second carrier 104 is long orthogonally to the drawing and holds the second mirror 104a and third mirror 104b in pair in which their surfaces are tilted orthogonally to each other. In synchronization with the motion of the first carrier 103, the second carrier 104 moves to a position 104' indicated by the broken line at a constant speed of V/2. The light reflected by an image of the original document TD is reflected by the first mirror 103c and then by the second and third mirrors 104a, 104b of the second carrier 104 to be incident on the image reading lens 105. The image reading lens forms a reduced optical image of the document image on the imaging surface of the line sensor 106 via the cover glass. Thus, the first to third mirrors 103c, 104a, 104b are a reflective system. The first and second carriers 103, 104 are driven by a not shown driver as indicated by the arrows in the drawing. The speed V/2 of the second carrier 104 is a half of that of the first carrier 103 so that while the first carrier 103 moves a certain amount, the second carrier 104 moves by a half of the moving amount of the first carrier 103.

The light source 103a, light source mirror 103b, and first mirror 103c move integrally with the first carrier 103 to illuminate the original document TD entirely. Since the speed ratio of the first and second carriers 103, 104 is V:V/2=2:1, the optical path length from the illuminated portion of the document to the image reading lens 105 is maintained to be almost unchanged. The line sensor is a 3-line CCD sensor to convert an image of the document into signals along with scanning of the original document TD. Thus, the original document TD is read and a color image thereof is read in three primary colors. The image reading device 100 is a full-color image reader and comprises the line sensor 116 including the RGB filters on the optical path of the image reading lens 105.

In the line sensor 106 micro-size photoelectric conversion elements are closely arranged in a direction orthogonal to FIG. 15 to output electric signals of the document image in unit of pixel along with the scanning of the original document TD. The line sensor 106 can read a color document by reading color information of a document image in three colors and synthesizing the converted electric signals of the three colors. The electric signals are converted to image signals through signal processing as A/D conversion and stored in a not-shown memory when needed. Owing to the image reading lens 105 according to the first embodiment, the image reading device can be downsized. Further, to separate color of an image, a color separation prism or filter can be selectively inserted between the image reading lens or the line sensor or RGB light sources can be lighted in order to emit RGB light beams to the original document. Thus, the image reading device comprising the image reading lens 105 according to the first embodiment can be provided with a color separation function on the optical path of the image forming lens to read document information in full color.

Third Embodiment

Figure 16:
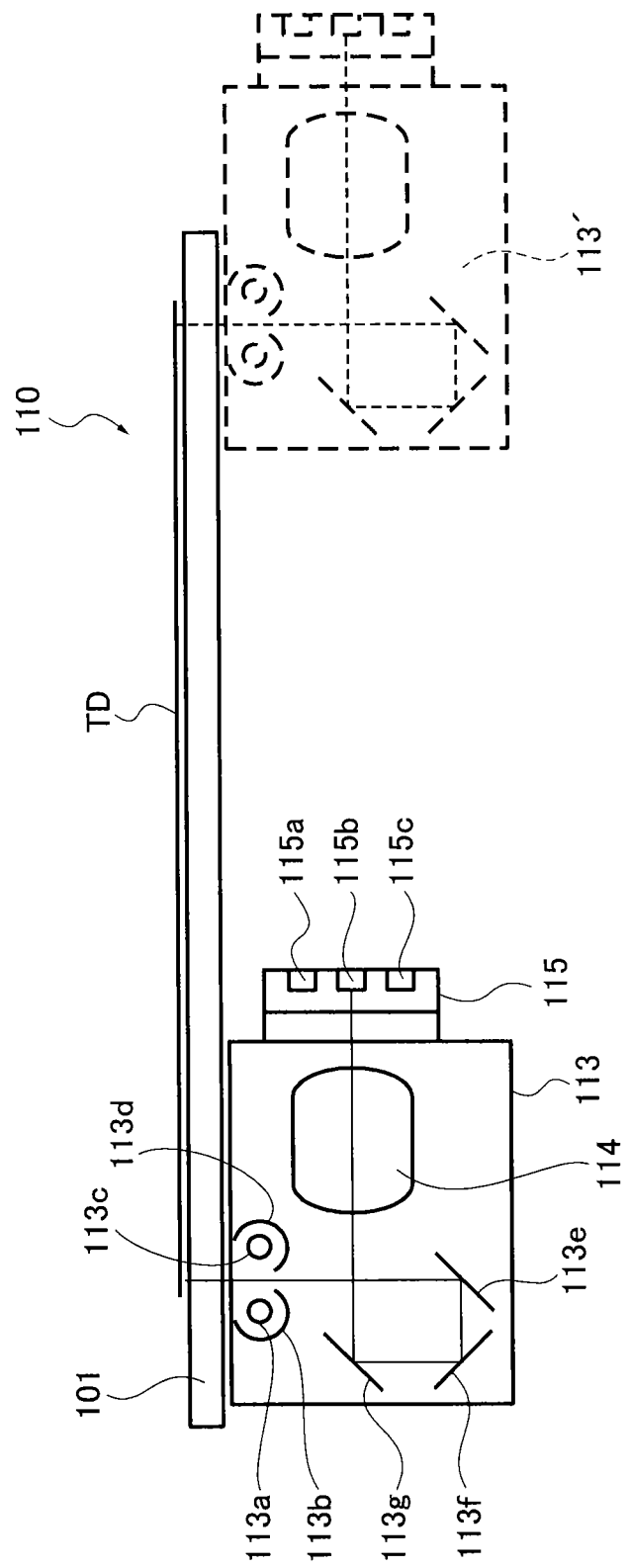
FIG. 16 is a cross section view of the essential part of an image reading device according to a third embodiment.

The image reading device can be comprised of an image reading unit integrally having an illumination unit to illuminate a document on the contact glass in a slit-like manner, a line sensor, mirrors forming an optical path from the document to the line sensor, an image reading lens, and a driver. The image reading unit is configured to be moved relative to a document by the driver to scan the document. This is the structure of an image reading device according to a third embodiment including the image reading lens according to the first embodiment as an imaging lens. The third embodiment is described referring to FIG. 16. FIG. 16 is a vertical cross section view of the structure of the image reading device. An image reading device 110 comprises a contact glass 101, an image reading unit 113, an image reading lens 114, and a line sensor 115.

The image reading unit 113 comprises and holds a first light source 113a, a first light source mirror 113b, a second light source 113c, a second light source mirror 113d, a first mirror 113e, a second mirror 113f and a third mirror 113g. The line sensor 115 comprises photoelectric conversion elements 115a, 115b, 115c with RGB filters arranged in three lines on a single chip. The image reading lens 114 is the one according to the first embodiment. The original document TD is placed on the contact glass 101. The image reading unit 113 is provided below the contact glass 101. The line sensor 115 and image reading lens 114 are integrated with the image reading unit 113.

The first and second light sources 113a, 113c extend long in a direction orthogonal to the drawing and can be a halogen lamp, xenon lamp, a fluorescent lamp as cold-cathode tube, one in which point sources like LEDs are arranged in row, a linear light source using an optical guide to convert point source to linear source, or a long surface light source as organic EL (electro-luminescence), as the light source 103a in FIG. 15. The first and second light sources 113a, 113c are controlled to emit light when the image reading unit 113 moves rightward in FIG. 16. The light therefrom is guided by the first and second light source mirrors 113b, 113d of a long semi-cylindrical shape and illuminates a slit-like portion of the original document TD on the contact glass 101. The slit-like portion is long in a main scanning direction which is orthogonal to the drawing.

The first to third mirrors 113e, 113f, 113g are long in a direction orthogonal to the drawing and their surfaces are tilted at 45 degrees relative to a mount surface of the contact glass 101 and tilted orthogonally to each other in the image reading unit 113. While the image reading unit 113 moves to a position 113' indicated by a broken line at a constant speed, the light reflected by an image of the original document TD is reflected by the first mirror 113e and then by the second and third mirrors 113f, 113g in order to be incident on the image reading lens 114. The image reading lens 114 forms a reduced optical image of a document image on the imaging surface of the line sensor 115 via the cover glass. Thus, the first to third mirrors 113e, 113f, 113g are a reflective system. The image reading unit 113 is driven by a not-shown driver as indicated by the arrows in FIG. 16.

Since the first to third mirrors 113e, 113f, 113g are integrally supported in the image reading unit 113, the optical path length from the illuminated portion of the document to the image reading lens 114 is maintained to be constant during scanning. The image formed on the light receiving surface of the line sensor 115 is converted to electric signals, whereby document information is read, as in the second embodiment.

Fourth Embodiment

Figure 17:
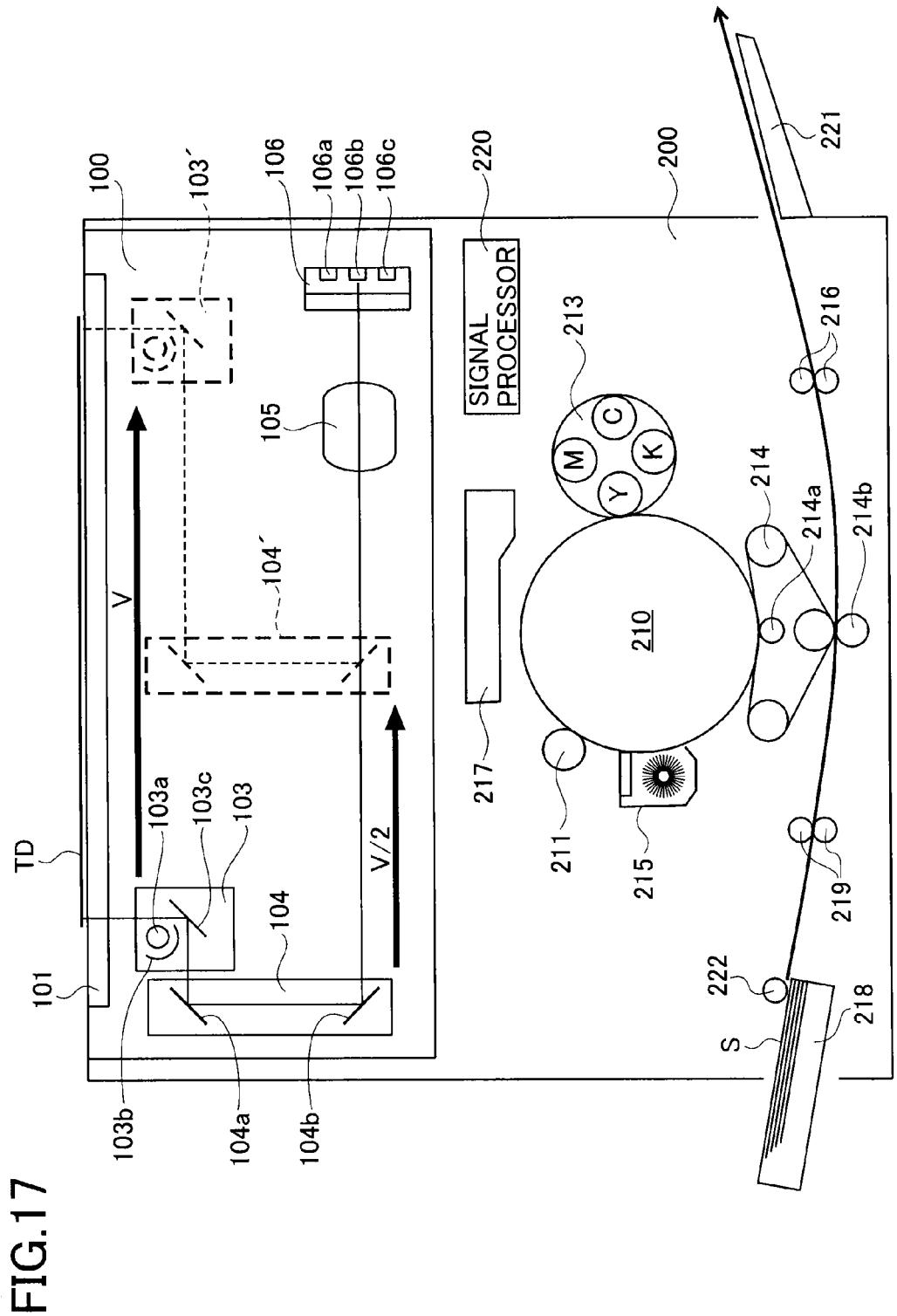
FIG. 17 is a cross section view of the essential part of an image forming device according to a fourth embodiment.

An image forming device comprising the image reading device according to either the second or third embodiment is described referring to FIG. 17. FIG. 17 is a vertical cross section view of the structure of an image forming device according to a fourth embodiment. The image forming device in FIG. 17 comprises the image reading device 100 in FIG. 15 according to the second embodiment and an image forming unit 200. The image reading device 100 is a structure same as in the second embodiment and comprises the contact glass 101, first carrier 103, second carrier 104, image reading lens 105, and line sensor 106. The first carrier 103 includes the light source 103a, light source mirror 103b, and first mirror 103c and the second carrier 104 includes the second mirror 104a and third mirror 104b. The line sensor 106 as a 3-line CCD sensor comprises the photoelectric conversion elements 106a, 106b, 106c with RGB filters arranged in three lines on a single chip.

The image reading lens 105 is the one according to the first embodiment. The image reading device can be formed as the image reading unit in FIG. 16. That is, the image forming device can include the image reading unit in FIG. 16 according to the third embodiment in place of the one in FIG. 15 according to the second embodiment. The image forming unit 200 is positioned below the image reading device 100 and comprises a photoconductor 210, a charging roller 211, a developing unit 213, a transfer belt 214, a cleaner 215, a fixing unit 216, an optical scanner 217, a paper cassette 218, a registration roller pair 219, a signal processor 220, a paper tray 221, and a paper feed roller 222. The transfer belt 214 includes a transfer voltage apply roller 214a and a transfer roller 214b.

In FIG. 17 an image signal from the line sensor 106 of the image reading device 100 is transmitted to the signal processor 220 of the image forming unit 200 and converted to a color write signal for yellow (Y), magenta (M), cyan (C), and black (B). The image forming unit 200 includes the photoconductor 210 as a latent image bearer, and the charging roller 211, turret-type developing unit 213, transfer belt 214, and cleaner 215 are disposed around the photoconductor 210. The charging roller 211 can be replaced with a corona charger. The optical scanner 217 writes an image on the photoconductor 210 by scanning, in response to the write signal from the signal processor 220, and scans the photoconductor 210 between the charging roller 211 and developing unit 213. For image forming, the photoconductor is rotated counterclockwise at constant speed and the surface thereof is evenly charged by the charging roller 211 and exposed with the laser beam from the optical scanner 217 to form an electrostatic latent image. The electrostatic latent image is a negative latent image and an image portion is exposed.

Yellow, magenta, cyan, and black images are written in order on the photoconductor 210 along with the rotation of the photoconductor 210. The formed electrostatic latent image is reversely developed with yellow, magenta, cyan, black toners by respective units Y, M, C, K of the developing unit 213 and visualized as positive images. The four-color toner images are transferred and superimposed onto the transfer belt 214 by the transfer voltage apply roller 214a to form a color image thereon. The paper cassette 218 is detachable from a device body and contains sheets of paper S as a recording medium. A topmost sheet of paper S is extracted from the paper cassette 218 by a paper feed roller 222 and an end thereof is captured by the registration roller pair 219. The registration roller pair 219 transmits the paper S to a transfer unit at a timing at which the color image is transferred to a transfer position. The paper S is placed on the color image and the color image is electrostatically transferred on the paper S by pressure from the transfer roller 214b.

The paper S on which the color image is transferred is transmitted to the fixing unit 216 to fix the color image thereby. Then, the paper S is ejected to the paper tray 221 by a not-shown paper eject roller pair through a not-shown guide path. The surface of the photoconductor 210 is cleaned after every image transfer to remove remnant toner and paper powder. The image forming device according to the present embodiment can be a monochrome image forming device in place of a color image forming device. By use of the image reading lens according to any of the first to seventh examples of the first embodiment, the image reading device can be reduced in thickness. In a compact image forming device of in-body paper eject type having a paper output between the image reading device and image forming unit, the space between the two devices can be widened by use of the thin-thickness image reading device. Thereby, it is possible for an operator to visually recognize output papers more easily, resulting in facilitating an operator's work.

The above embodiments have described the use of circular lenses only. However, for the purpose of reducing the height of the image reading device, lenses of oval coin shape with top and bottom portions cut off can be used to form the image reading lens. As described above, it is made possible to provide a compact image reading lens at angle of view of 56 degrees or more which can prevent a decrease in image reading accuracy due to a temperature change. Further, it is made possible to realize a high performance, high quality image reading lens which can reduce color aberration and image blur. Further, such a compact image reading lens can contribute to downsizing and lighting the image reading device and reducing the cost thereof.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An image reading lens, comprising:
   a front lens group disposed on an object side, comprising first, second, third, fourth, and fifth lenses including a positive lens and a negative lens; and
   a rear lens group disposed on an image side, comprising a negative plastic lens, wherein
   the image reading lens has an angle of view of 56 degrees or more, and
   the image reading lens is formed to satisfy the following four conditions:

$$0 < \Sigma dn_N/dt(N) - \Sigma dn_P/dt(P) < 25, \quad (1)$$

$$0.10 < fa/f \times d_{11}/D < 0.90, \quad (2)$$

$$-1.5 < fb/f < -0.5, \text{ and} \quad (3)$$

$$0.35 < d_{11}/D < 0.70, \quad (4)$$

where:
$\Sigma dn_N/dt(N)$ is a sum of temperature coefficients of refractive indexes, multiplied by $10^6$, of the negative lenses of the front lens group along a He—Ne line at a temperature of 40° C. to 60° C.,
$\Sigma dn_P/dt(P)$ is a sum of temperature coefficients of refractive indexes, multiplied by $10^6$, of the positive lenses of the front lens group along a He—Ne line at a temperature of 40° C. to 60° C., respectively,
fa is a focal length of the front lens group,
fb is a focal length of the rear lens group,
f are focal length of the entire image reading lens,
$d_{11}$ is an on-axis distance between the front lens group and the rear lens group, and
D is a total length of the image reading lens.

2. The image reading lens according to claim 1, wherein the front lens group is formed to satisfy the following condition:

$$5 < \nu_P - \nu_N < 30, \quad (5)$$

where:
$\nu_P$ is a mean value of abbe numbers of the positive lens relative to an e-line, and
$\nu_N$ is a mean value of abbe numbers of the negative lens relative to the e-line.

3. The image reading lens according to claim 1, wherein the front lens group is formed to satisfy the following condition:

$$-1.2 < R_3/R_{11} < -0.4, \quad (6)$$

where:
$R_3$ is a curvature radius of an object-side surface of the first lens of the front lens group, and
$R_{11}$ is a curvature radius of an image-side surface of the fifth lens of the front lens group.

4. The image reading lens according to claim 1, wherein the image reading lens is formed to satisfy the following condition:

$$0.25 < (\phi b - \phi a)/d_{11} < 0.65, \quad (7)$$

where:
- φa is an effective diameter of an image-side surface of the fifth lens of the front lens group,
- φb is an effective diameter of an object-side surface of the negative lens of the rear lens group, and
- $d_{11}$ is the on-axis distance between the front lens group and the rear lens group.

5. The image reading lens according to claim 1, wherein at least one surface of the rear lens group is aspheric.

6. The image reading lens according to claim 1, wherein both surfaces of the negative plastic lens of the rear lens group are aspheric.

7. The image reading lens according to claim 1, wherein the front lens group comprises a biconvex lens, a biconcave lens, a negative meniscus lens, a biconvex lens, and a negative meniscus lens arranged in order from the object side.

8. The image reading lens according to claim 1, wherein the first lens and the second lens of the front lens group are a cemented lens and a fourth lens and a fifth lens are a cemented lens.

9. The image reading lens according to claim 1, wherein at least one surface of the front lens group is aspheric.

10. The image reading lens according to claim 1, wherein an outer shape of the negative plastic lens of the rear lens group is not rotationally symmetric relative to an optical axis.

11. The image reading lens according to claim 10, wherein the outer shape of the negative plastic lens of the rear lens group is a short strip long in a main scanning direction.

12. An image reading device comprising the image reading lens according to claim 1.

13. The image forming device comprising the image reading device according to claim 12.

* * * * *